(12) United States Patent
    Sako

(10) Patent No.: US 7,966,498 B2
(45) Date of Patent: Jun. 21, 2011

(54) DATA OUTPUTTING METHOD, DATA OUTPUTTING APPARATUS, DATA REPRODUCING METHOD, DATA REPRODUCING APPARATUS, DATA RECORDING METHOD, DATA RECORDING APPARATUS, AND RECORD MEDIUM

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 789 days.

(21) Appl. No.: 11/601,210

(22) Filed: Nov. 17, 2006

(65) Prior Publication Data
    US 2007/0067649 A1    Mar. 22, 2007

Related U.S. Application Data

(62) Division of application No. 10/148,822, filed as application No. PCT/JP01/08747 on Oct. 4, 2001, now abandoned.

(30) Foreign Application Priority Data

Oct. 4, 2000    (JP) ................................ P2000-304914

(51) Int. Cl.
    *G06F 21/00*    (2006.01)
    *G06F 21/24*    (2006.01)
    *G06F 21/22*    (2006.01)
    *G06F 12/14*    (2006.01)
    *G06F 11/30*    (2006.01)

(52) U.S. Cl. ........ 713/189; 713/150; 713/193; 386/252; 386/248; 386/239; 386/249; 386/250; 380/234; 380/242; 380/210; 380/235; 380/200; 705/57; 705/51; 726/27; 726/26; 726/32

(58) Field of Classification Search .................. None
    See application file for complete search history.

(56) References Cited

U.S. PATENT DOCUMENTS

| | | | |
|---|---|---|---|
| 6,321,984 B1 * | 11/2001 | McCall et al. ................. 235/381 |
| 6,529,506 B1 * | 3/2003 | Yamamoto et al. ........... 370/389 |
| 6,728,883 B1 * | 4/2004 | Kohashi et al. ................. 726/26 |
| 6,839,503 B1 | 1/2005 | Hirai et al. |
| 6,865,553 B2 * | 3/2005 | Morito et al. .................... 705/57 |
| 6,922,777 B1 * | 7/2005 | Iwamura ........................ 713/165 |
| 6,954,540 B2 | 10/2005 | Maeno |
| 6,954,856 B1 | 10/2005 | Kohashi et al. |
| 6,985,962 B2 | 1/2006 | Philyaw |
| 7,010,577 B1 | 3/2006 | Philyaw et al. |
| 7,116,797 B2 * | 10/2006 | Matsuo .......................... 382/100 |
| 7,218,750 B1 | 5/2007 | Hiraishi et al. |
| 7,240,206 B2 * | 7/2007 | Kori et al. ..................... 713/176 |
| 7,337,321 B2 | 2/2008 | Terada et al. |

(Continued)

FOREIGN PATENT DOCUMENTS

| | | |
|---|---|---|
| EP | 1071091 | 1/2001 |
| JP | 2000-115726 A | 4/2000 |
| JP | 2000-165335 A | 6/2000 |

(Continued)

*Primary Examiner* — Syed A. Zia
(74) *Attorney, Agent, or Firm* — Lerner, David, Littenberg, Krumholz & Mentlik, LLP

(57) ABSTRACT

A reproducing method is disclosed, that comprises the steps of determining whether or not additional data has been read from data that had been read from a loaded record medium, and when the determined result represents that the additional data has been read from the data, performing a reproducing process for the data that had been read from the record medium corresponding to reward data contained in the additional data.

12 Claims, 15 Drawing Sheets

U.S. PATENT DOCUMENTS

| | | | |
|---|---|---|---|
| 7,414,924 B2 * | 8/2008 | Oshima et al. | 369/13.35 |
| 2001/0011252 A1 * | 8/2001 | Kasahara | 705/52 |
| 2001/0042043 A1 * | 11/2001 | Shear et al. | 705/51 |
| 2002/0150246 A1 * | 10/2002 | Ogino | 380/203 |
| 2004/0131183 A1 * | 7/2004 | Sako | 380/202 |
| 2005/0232595 A1 | 10/2005 | Hirai | |

FOREIGN PATENT DOCUMENTS

| | | |
|---|---|---|
| JP | 2001-223984 A | 8/2001 |
| JP | 2001-350759 A | 12/2001 |
| JP | 2002-027224 A | 1/2002 |
| JP | 2002-077572 A | 3/2002 |

* cited by examiner

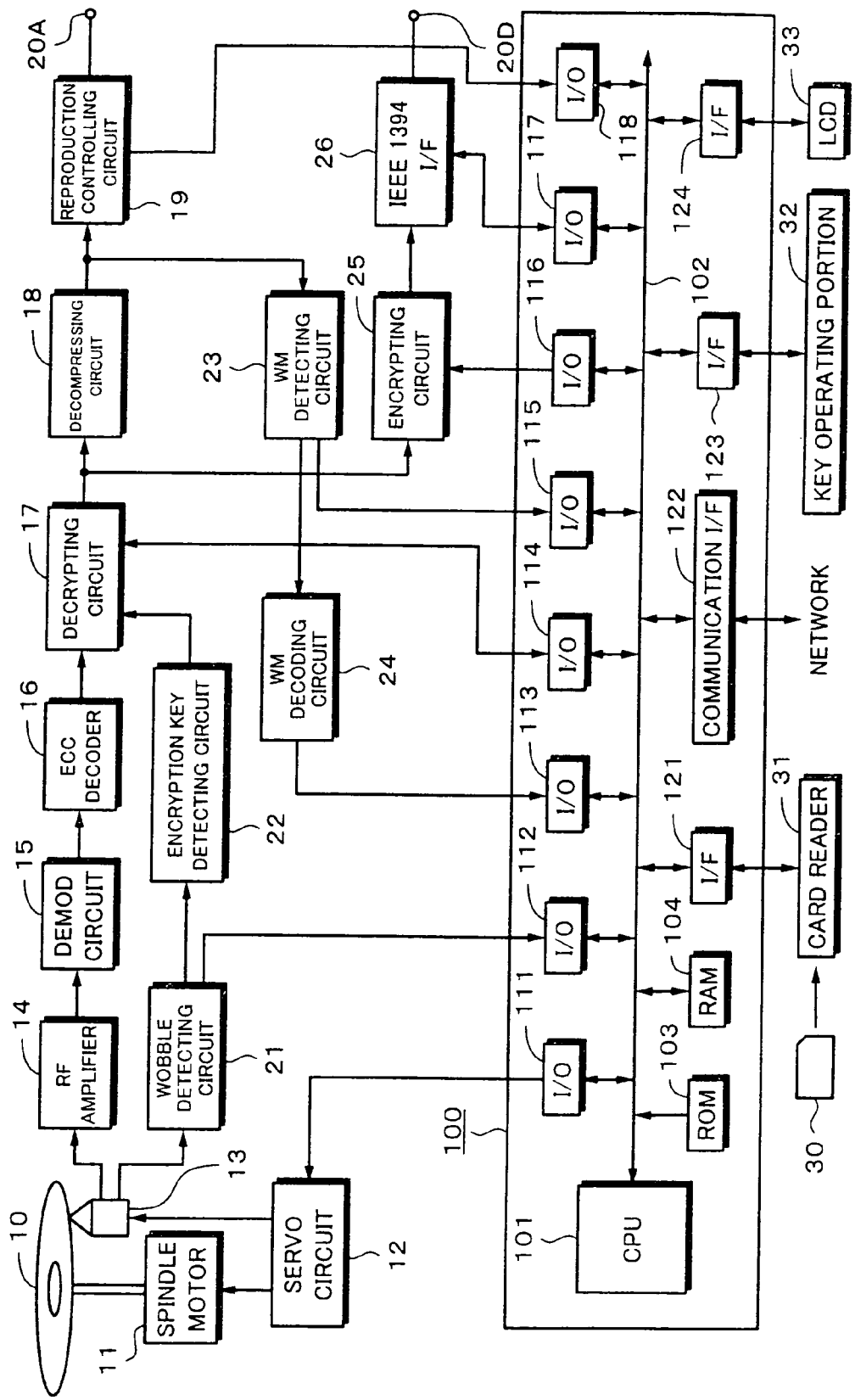

Fig. 2A
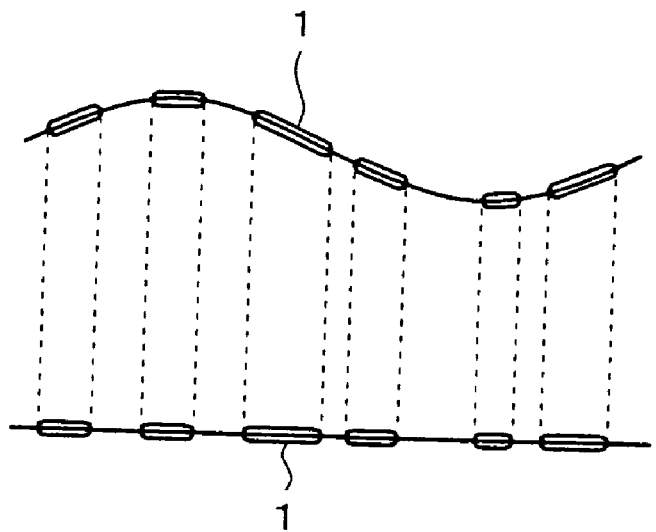
Fig. 2B
Fig. 3
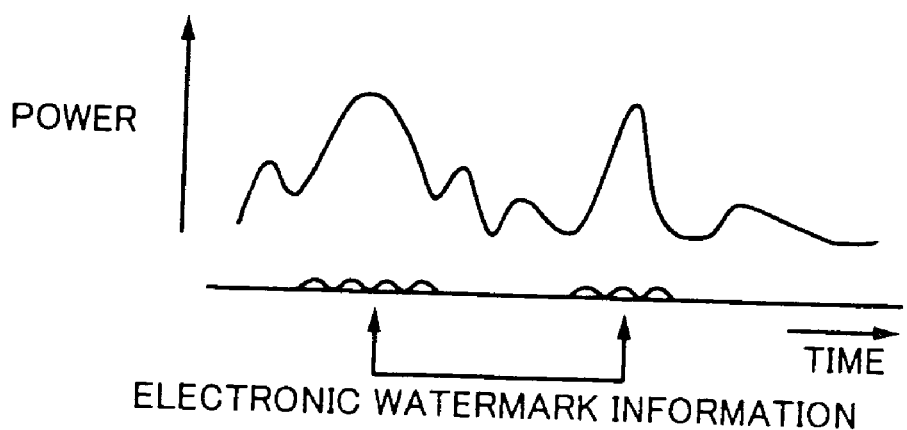

| SCMS DATA (2 BITS) | | DESCRIPTION |
|---|---|---|
| 0 | 0 | COPY FREE |
| 0 | 1 | ONE GENERATION COPY PERMITTED |
| 1 | 0 | RESERVED |
| 1 | 1 | COPY PROHIBITED |

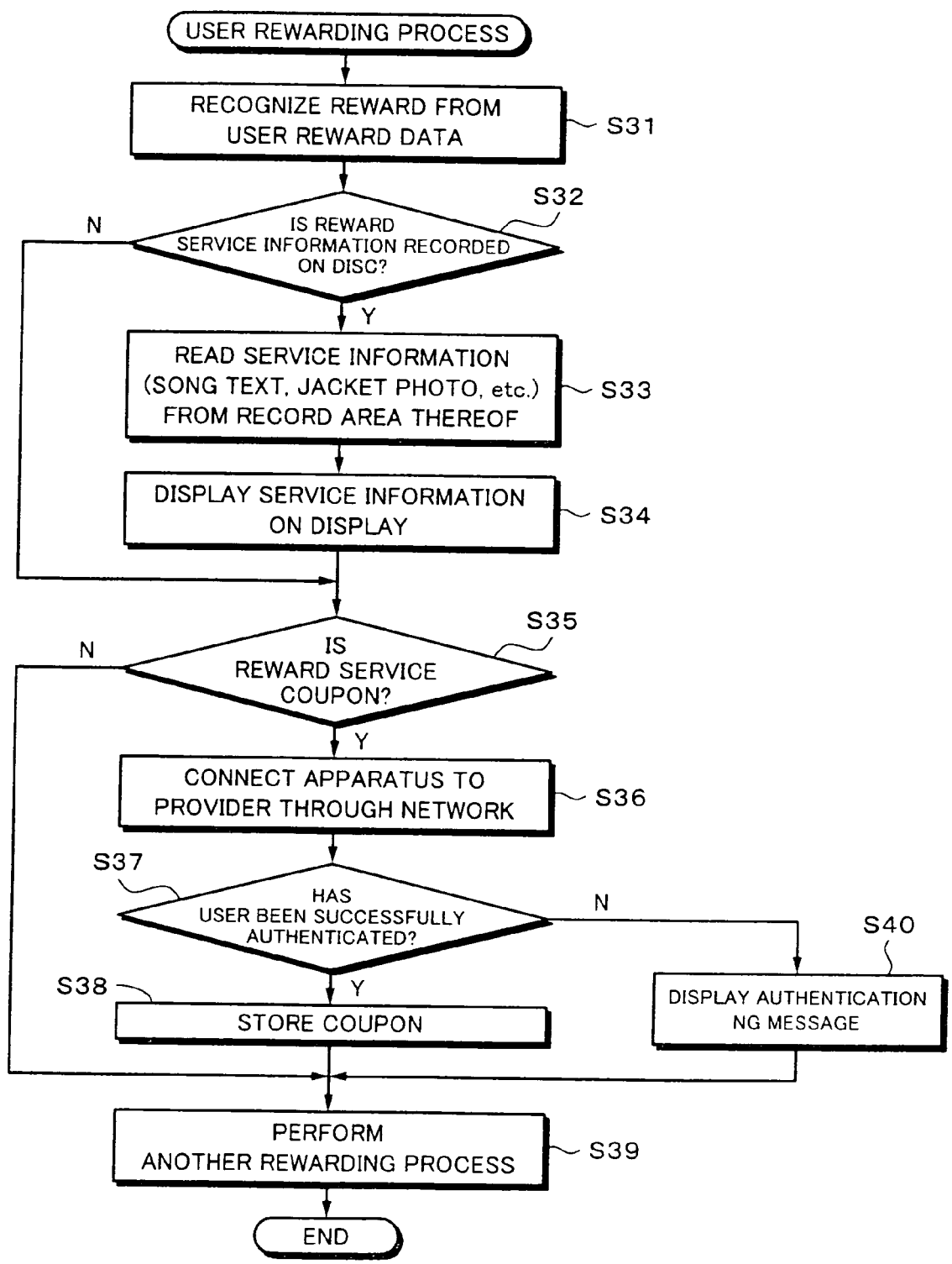

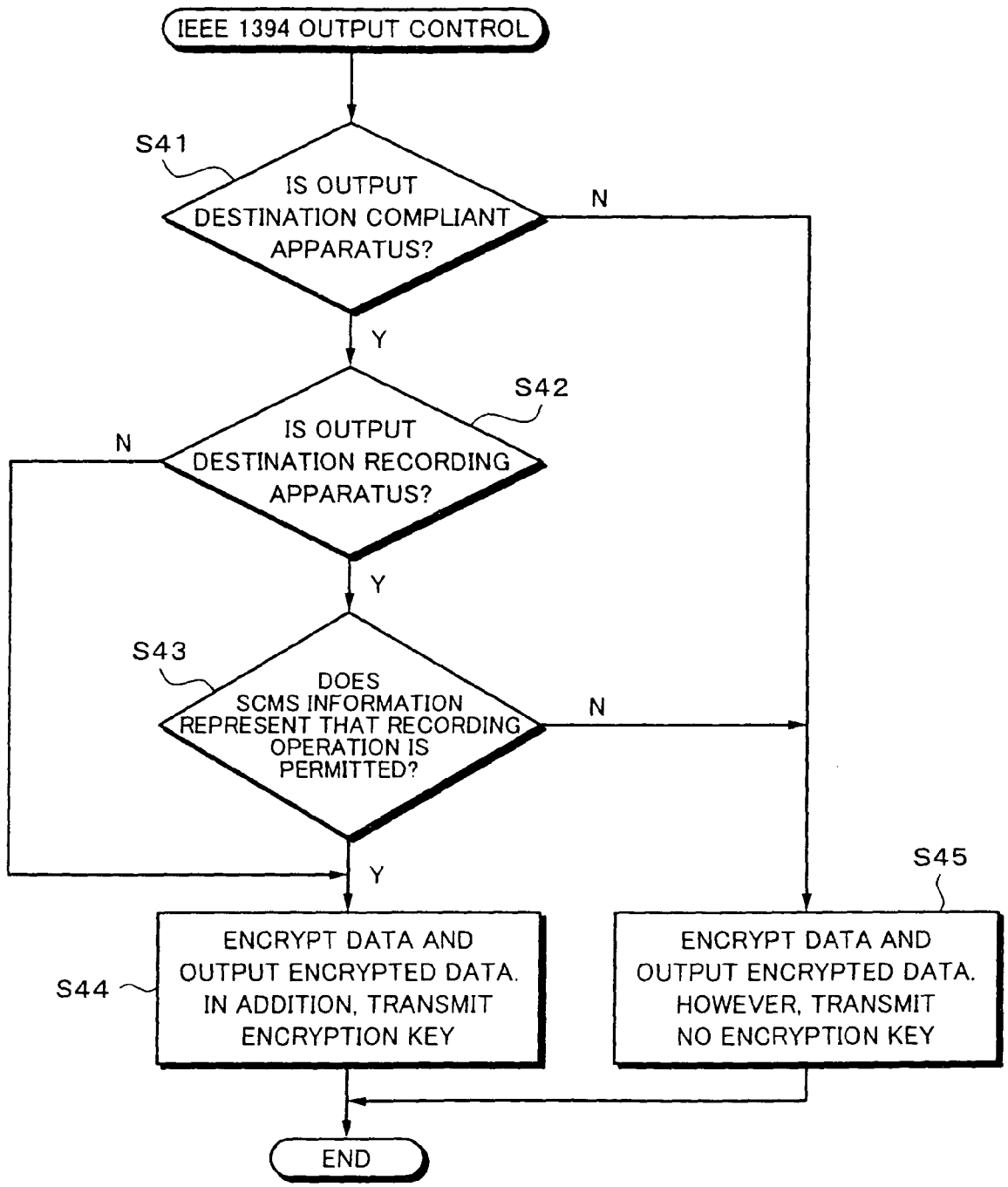

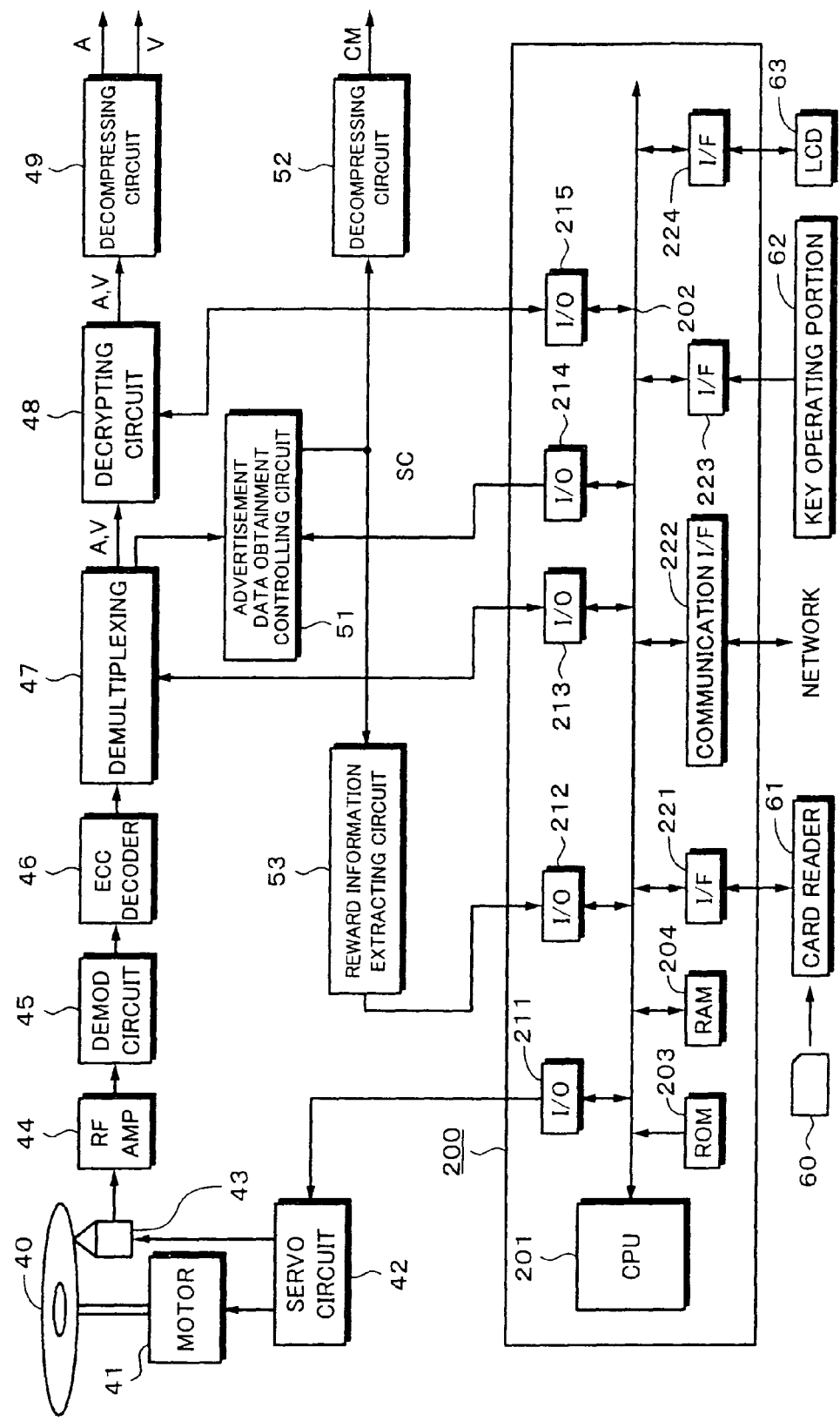

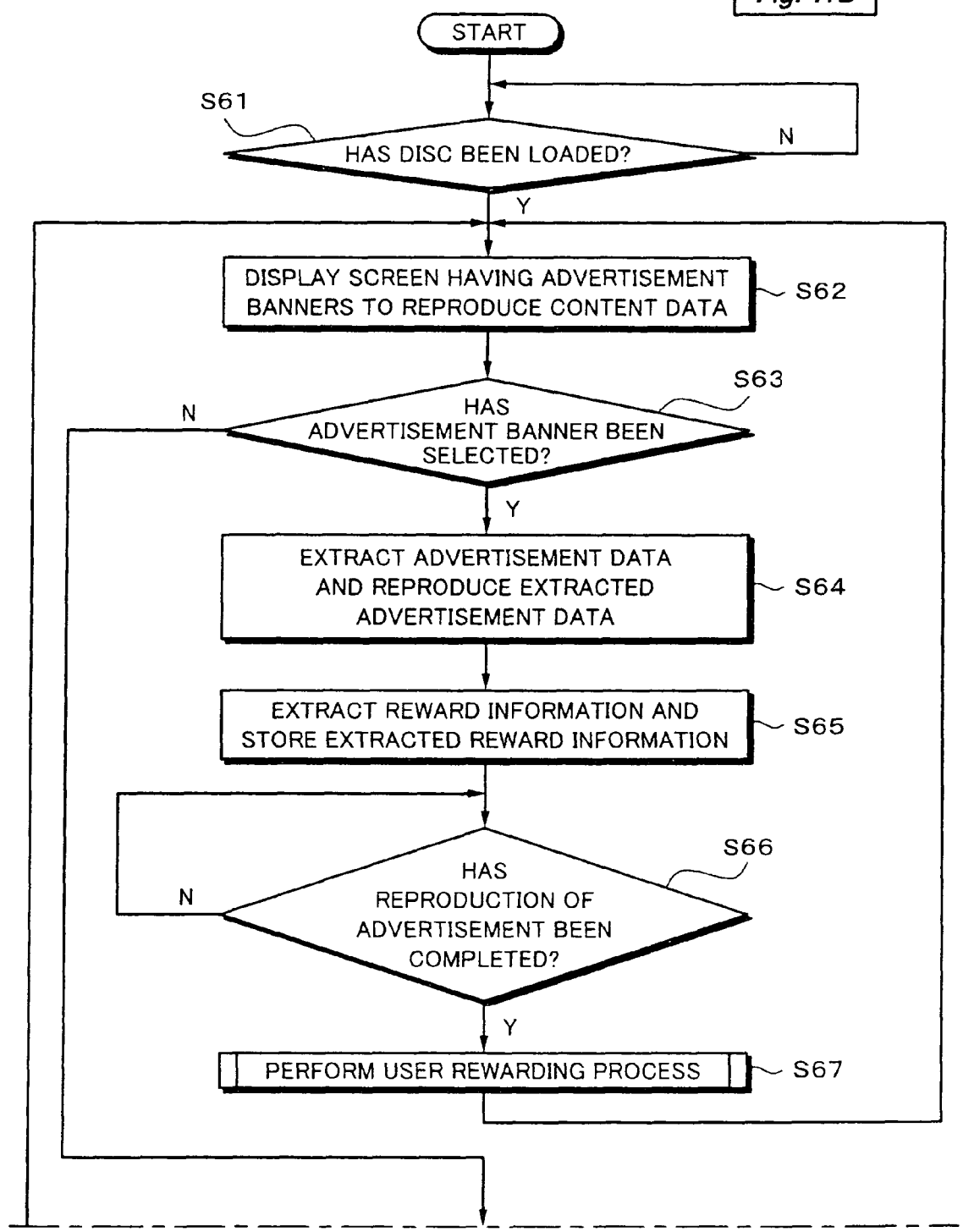

US 7,966,498 B2

DATA OUTPUTTING METHOD, DATA OUTPUTTING APPARATUS, DATA REPRODUCING METHOD, DATA REPRODUCING APPARATUS, DATA RECORDING METHOD, DATA RECORDING APPARATUS, AND RECORD MEDIUM

CROSS-REFERENCE TO RELATED APPLICATIONS

This application is a divisional of U.S. application Ser. No. 10/148,822, filed on Jun. 3, 2002, which is a national stage application of PCT/JP01/08747 filed on Oct. 4, 2001, which is based on Japan Patent Application No. 2000-304914 filed on Oct. 4, 2000. The disclosures of which are hereby incorporated herein by reference.

TECHNICAL FIELD

The present invention relates to a data outputting method and a data outputting apparatus for outputting data of a content for example music, a movie, and a game program (in this specification, such data is referred to as content data), a data reproducing method and a data reproducing apparatus for the content data, a recording method and a recording apparatus for the content data, and record medium on which the content data has been recorded.

BACKGROUND ART

In recent years, as the Internet and digital contents such as so-called compact discs and digital video discs are becoming common, problems of which the digital contents are illegally copied and the copyrights thereof are infringed have taken place.

From a view point of the protection of the copyright, to deal with a problem of copyright infringement, copyright information such as copyright control information is added to digital contents. It can be considered that with the additional information, digital contents are prevented from being illegally copied. Among illegal copy protecting technologies, an electronic watermark technology is becoming attractive because it is difficult to illegally forge additional information.

An electronic watermark process is a process for embedding additional information as noise to a perceptually unimportant portion of image data and music data (namely, a redundant portion of image data and music data).

It is difficult to remove the additional information that has been embedded in image data and music data by such an electronic watermark process. On the other hand, after a filtering process and a data compressing process have been performed for image data and music data, it is possible to detect the embedded additional information from the image data and music data.

Thus, it can be expected that the copyright of content data can be effectively protected in such a manner that copyright information such as copy generation restriction information as additional information of an electronic watermark (hereinafter, the additional information of the electronic watermark is referred to as electronic watermark information) is embedded in content data, the resultant content data is transmitted, and the copyright information is used for controlling a copying operation.

However, a detector that detects electronic watermark information is relatively expensive. Thus, when a detector that detects such electronic watermark information is used for an outputting apparatus, a reproducing apparatus, and a recording apparatus, from a view point of the manufactures thereof, their costs rise. Thus, when a system that causes the users to actively use the detectors is not assured, unless there is a legal restriction against the use of such a detector, it is difficult to force the manufactures to dispose the detectors in the apparatuses.

Likewise, when additional information such as advertise information is added to content data, a system that causes the users to actively use the additional information is important.

From a forgoing point of view, an object of the present invention is to provide a data outputting method, a data reproducing method, a data recording method, and their apparatuses, and a record medium that are suitable for a system that causes users to actively use additional data such as electronic watermark information and advertisement information of content data.

DISCLOSURE OF THE INVENTION

One invention is a reproducing method, comprising the steps of determining whether or not additional data has been read from data that had been read from a loaded record medium, and when the determined result represents that the additional data has been read from the data, performing a reproducing process for the data that had been read from the record medium corresponding to reward data contained in the additional data.

One invention is a data outputting method, comprising the steps of when data is output, the data being read from a loaded record medium, additional data being added to the data, determining whether or not an output destination apparatus to which the data is output is an apparatus that satisfies a predetermined condition, when the determined result represents that the output destination apparatus is an apparatus that satisfies the predetermined condition, determining whether or not the output destination apparatus is a recording apparatus, when the determined result represents that the output destination apparatus is a recoding apparatus, encrypting the data that has been read from the record medium, outputting the encrypted data, and also outputting an encryption key for decrypting the encrypted data that has been read from the record medium.

One invention is a recording method, comprising the steps of when data to which additional data has been added is recorded, detecting whether or not the additional data has been detected from the data to be recorded, and when the additional data has been detected, recording the data with the original quality.

One invention is a recording apparatus for a record medium, comprising an additional data detecting portion for detecting additional data added to input data, a selecting circuit portion for selecting the quality of the input data, an encoder for performing an encoding process for causing output data of the selecting circuit to be recorded, a head portion to which output data of the encoder is supplied, and a controlling portion to which a detected output of the additional data detecting portion is supplied, when the additional data has been detected by the additional data detecting portion, the controlling portion causing the selecting circuit portion to output data with the same quality as the input data.

One invention is a reproducing apparatus for a record medium, comprising an advertisement data obtaining portion for obtaining advertisement data from data that has been read from the record medium, a reward data extracting portion for extracting reward data from the advertisement data obtaining portion, a decoding portion for performing a decoding process for the data that has been read from the record medium, an operating portion operated by a user, and a controlling portion for determining whether or not the operating portion has been operated by the user and the advertisement data has been reproduced and reproducing the data that has been read from the record medium corresponding to the reward data extracted by the reward data extracting portion when the determined result represents that the advertisement data has been reproduced.

One invention is a reproducing apparatus for a record medium, comprising a decoding processing portion for performing a decoding process for data that has been read from a record medium, an additional data detecting portion for detecting whether or not additional data has been detected from the data that had been read from the record medium, and a controlling portion for performing a reproducing operation for the data that had been read from the record medium corresponding to the detected additional data when the detected result of the additional data detecting portion represents that the additional data has been detected from the data that had been read from the record medium.

One invention is a record medium on which content data and additional data containing reward data added to the content data have been recorded.

BRIEF DESCRIPTION OF DRAWINGS

FIG. 1 is a block diagram showing a data reproducing apparatus according to a first embodiment of the present invention;

FIG. 2 is a schematic diagram for explaining an operation of the embodiment shown in FIG. 1;

FIG. 3 is a schematic diagram for explaining an example of electronic watermark information;

FIG. 8 is a flow chart for explaining a user rewarding process according to the embodiment shown in FIG. 1;

FIG. 9 is a flow chart for explaining a data outputting control according to the embodiment shown in FIG. 1;

FIG. 10 is a block diagram showing a data reproducing apparatus according to a second embodiment of the present invention;

BEST MODES FOR CARRYING OUT THE INVENTION

Figures 4, 5:
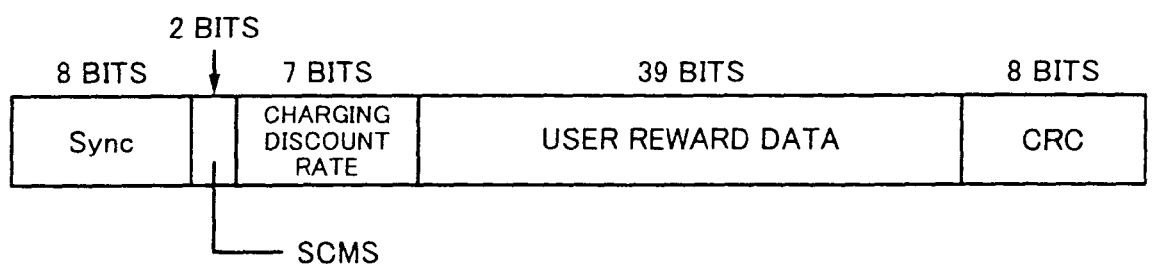
FIG. 4 is a schematic diagram for explaining user reward information according to the embodiment shown in FIG. 1.
FIG. 5 is a schematic diagram for explaining an example of copyright management information.

Next, with reference to the accompanying drawings, embodiments of the present invention will be described.

[Data Reproducing Apparatus According to First Embodiment]

FIG. 1 is a block diagram showing a data reproducing apparatus according to a first embodiment of the present invention. The first embodiment of the present invention is a data outputting apparatus. According to the first embodiment, content data is music data.

A record medium from which a reproducing operation is preformed according to the first embodiment is an optical disc 10. In addition, according to the first embodiment, when data recorded on the optical disc is reproduced, a charging process is performed corresponding to a prepaid system.

The optical disc 10 is a reproduction-only (hereinafter referred to as ROM (Read Only Memory) type) disc or a recordable (hereinafter referred to as RAM (Random Access Memory) type) disc. Any of the ROM type disc and the RAM type disc can be loaded to the reproducing apparatus. The reproducing apparatus can reproduce data from any of the ROM type disc and the RAM type disc.

The former ROM type disc is a disc on which data is pre-recorded by an authoring system of a record company or the like. In contrast, the latter RAM type disc is a disc on which the user can record personal data. According to the embodiment, a CD-R (Compact Disc-Recordable) disc and a CD-RW (Compact Disc-ReWritable) disc can be used.

According to the embodiment, content data recorded on a ROM type disc has been encrypted. As shown in FIG. 2A, wobbled pits 1 have been formed. As pit wobble information, an encryption key has been recorded.

Since the pit wobble information cannot be recorded by a regular recording apparatus, when the pit wobble information is copied to a RAM type disc, the pit wobble information is formed as a non-wobble pit sequence as shown in FIG. 2B. Thus, the data reproducing apparatus according to the embodiment determines whether the loaded disc is a ROM type disc or a ROM type disc by detecting pit wobbles. When the loaded disc is a ROM type disc, the data reproducing apparatus extracts information of an encryption key from the pit wobble information and decrypts the encrypted content data.

Of course, when content data is recorded on a RAM disc, it is possible to encrypt content data and record the encrypted content data. In this case, the information of the encryption key may be obtained from for example a network or additional information of an electronic watermark.

According to the embodiment, content data is compressed and recorded on a disc.

According to the embodiment, additional information containing copyright information and user reward information is added as electronic watermark information to content data. As shown in FIG. 3, electronic watermark information is superimposed with audio data in such a manner that the electronic watermark information is not perceptible when the audio data is reproduced. The electronic watermark process is performed by using for example spectrum diffusion, masking effect, or the like.

According to the embodiment, additional data embedded as electronic watermark information is 64-bit data having a structure as shown in FIG. 4. In other words, in FIG. 4, the top four bits are a synchronous signal SYNC. The next two bits are copyright information. According to the embodiment, the copyright information is SCMS (Serial Copy Management System) information that is copy generation restriction information that is used for audio data. The SCMS information is 2-bit information as shown in FIG. 5.

The SCMS information is followed by 7-bit charging discount rate data. The charging discount rate data is followed by 39-bit user reward data. The charging discount rate data and the user reward data compose user reward information according to the embodiment. The charging discount rate data is data that represents a charging discount rate for which data reproduced from the optical disc 10 is discounted. The user reward data is information about user rewards other than the charging discount rate. The user reward data is for example information necessary for obtaining (1) song text in the case that audio content data is a song;
(2) jacket photo;
(3) various types of coupons; and
(4) points necessary for obtaining various types of services.

When data of the song text and the jacket photo is recorded on the optical disc 10, the information necessary for obtaining (1) song text and (2) jacket photo is record address information. When data of the song text and the jacket photo is stored in a server of a content provider on the network, the information necessary for obtaining (1) song text and (2) jacket photo is information about the server, content provider, and network.

(3) Various types of coupons are for example discount coupons for concert tickets and discount coupons for ROM discs. (4) Points necessary for obtaining various types of services are rewards for various services and goods corresponding to earned points. When the coupons and points are recorded on the optical disc 10, their information is obtained. The earned point information is periodically reported to the content provider on the network. The earned point information is stored in an account box of each user managed by the content provider. Corresponding to the earned points, the user can obtain various types of services and goods from the content provider.

When coupon information and point information are not recorded on the optical disc 10, corresponding to user reward data guide information or the like, the data reproducing apparatus accesses the content provider through the network. Thus, coupons and points are stored in the user account box of the content provider.

The last eight bits are error detection code. In the example, CRC (Cyclic Redundancy Check) code is used.

As shown in FIG. 1, the optical disc 10 on which content data, additional information as electronic watermark information, and other information have been recorded are rotated and driven by a spindle motor 11 under the control of a servo circuit 12 so that the optical disc 10 is rotated at the same speed as a so-called CD (Compact Disc) player. Data that is read from the optical disc 10 by an optical head 13 is supplied to a demodulating circuit 15 through an RF amplifier 14.

In the demodulating circuit 15, data that is read from the optical disc 10 by the optical head 13 (namely, data recorded corresponding to EFM (Eight-to-Fourteen Modulation) is demodulated. Data that is demodulated by the demodulating circuit 15 is supplied to an ECC (Error Correction Code) decoder 16. The ECC decoder 16 performs an error correcting process for the output data of the demodulating circuit 15 using for example CIRC (Cross Interleave Reed-Solomon Code). The error-corrected audio PCM (Pulse Code Modulation) data is supplied to a decrypting circuit 17.

Information that is output from the optical head 13 is supplied to a wobble detecting circuit 21. When the optical disc 10 is a ROM disc, pit wobbles are detected. The wobble detecting circuit 21 supplies the detected output that represents whether or not it has detected pit wobbles to a system controller 100. When the optical disc 10 is a ROM disc, pit wobble information detected by the wobble detecting circuit 21 is supplied to an encryption key detecting circuit 22. The encryption key detecting circuit 22 detects the encryption key and supplies the detected encryption key to the decrypting circuit 17.

The decrypting circuit 17 supplies an output that represents that it has decrypted the data of the ROM disc to the system controller 100. In addition, the decrypting circuit 17 supplies the decrypted content data to a decompressing circuit 18.

In the example, when the optical disc 10 is a RAM disc, content data is not encrypted. Thus, according to the embodiment, when the optical disc 10 is a RAM disc, reproduced content data is supplied to the decompressing circuit 18 through the decrypting circuit 17 under the control of the system controller 100 using a control signal thereof.

The decompressing circuit 18 decompresses compressed content data supplied from the decrypting circuit 17. The decompressed content data that is output from the decompressing circuit 18 is supplied to an output terminal 20A through a reproduction controlling circuit 19. In addition, the decompressed content data is supplied to an electronic watermark information detecting circuit 23. (On the accompanying drawings, "electronic watermark information" is denoted by WM.)

Information that represents whether or not the electronic watermark information detecting circuit 23 has detected electronic watermark information is supplied to the system controller 100. In addition, the electronic watermark information detected by the electronic watermark information detecting circuit 23 is supplied to an electronic watermark information decoding circuit 24.

The electronic watermark information decoding circuit 24 decodes the additional data shown in FIG. 4. The decoded data is supplied to the system controller 100. The system controller 100 performs a user rewarding process using the input additional data. The user rewarding process will be described later.

According to the embodiment, compressed audio data that is output from the decrypting circuit 17 is supplied to a compressed signal output terminal 20D through an encrypting circuit 25 and an IEEE (The Institute of Electrical and Electronics Engineers, Inc.) 1394 interface 26.

The system controller 100 is composed of a microcomputer. A CPU (Central Processing Unit) 101, a ROM 103, a RAM 104, I/O ports 111 to 118, a card reader interface 121, a communication interface 122, a key interface 123, and an LCD (Liquid Crystal Display) interface 124 are connected to a system bus 102.

The ROM 103 stores a process for a reproducing process, a program for a charging process (that will be described later), and a program for a user reward information process. The RAM 104 is used as a work area.

A card reader 31 that loads a prepaid card 30 is connected to the card reader interface 121. According to the embodiment, as will be described later, a charging process is performed using the prepaid card 30. The communication interface 122 is connected to a content provider through the network. A key operating portion 32 is connected to the key interface 123. A displaying portion 33 that is composed of an LCD is connected to the LCD interface 124.

Figure 6:
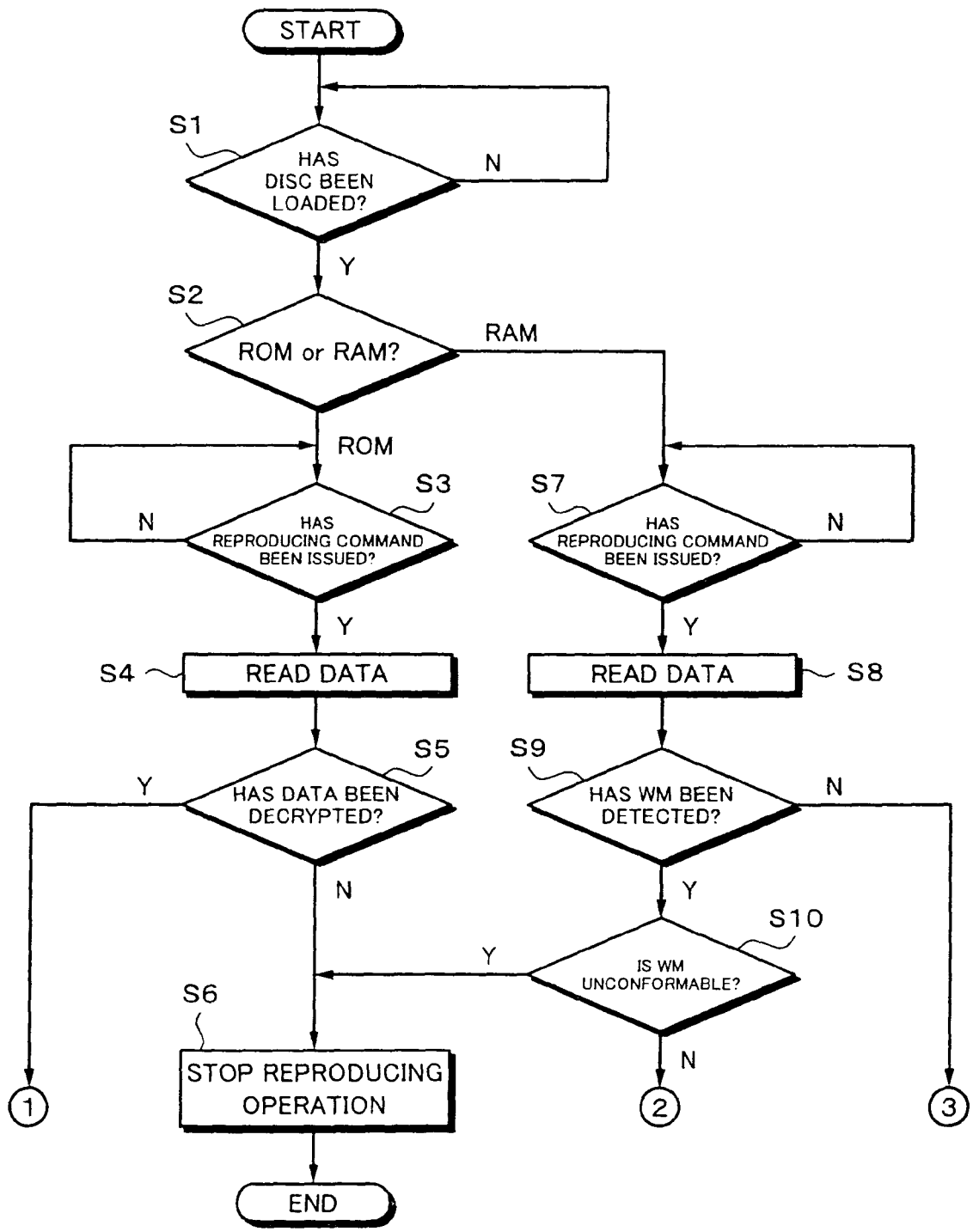
FIG. 6 is a part of a flow chart for explaining a reproducing operation according to the embodiment shown in FIG. 1.
Figure 7:
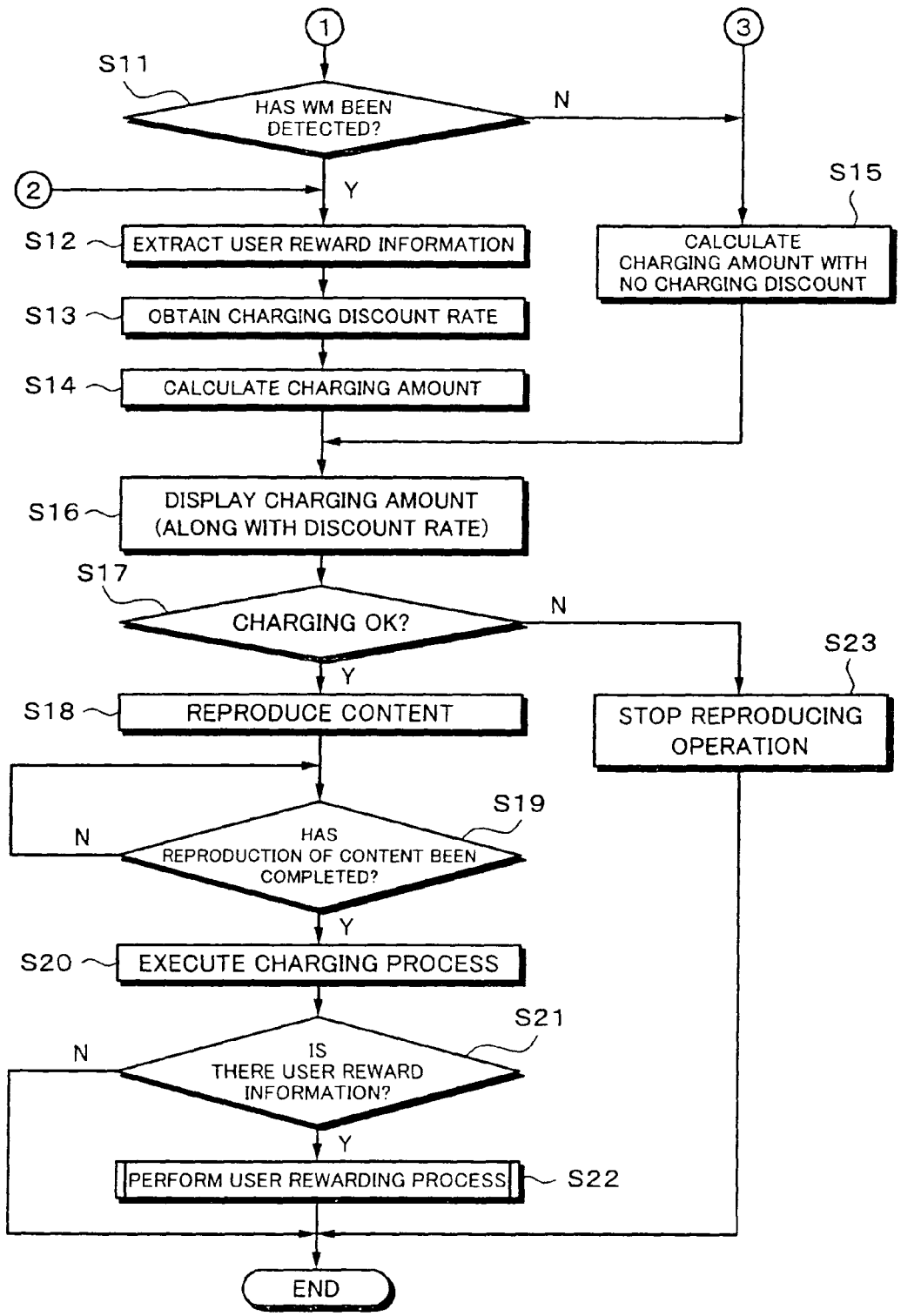
FIG. 7 is a part of the flow chart for explaining the reproducing operation according to the embodiment shown in FIG. 1.

Next, the data reproducing operation of the data reproducing apparatus according to the embodiment shown in FIG. 1 will be described with reference to flow charts shown in FIGS. 6 and 7. The process shown in the flow charts is executed by a program stored in the ROM 103 of the system controller 100.

First of all, it is determined whether or not the optical disc 10 has been loaded to the data reproducing apparatus (at step S1). Thereafter, it is determined whether or not the loaded optical disc 10 is the ROM type or the RAM type (at step S2). Besides the forgoing bit wobble information, the type (ROM type or RAM type) of the optical disc 10 may be determined by using an identifier that represents the type thereof or the difference of the reflectance thereof.

When the determined result at step S2 represents that the loaded optical disc 10 is the ROM type, it is determined whether or not a reproduction output command key has been operated with the key operating portion 32 (at step S3). When the determined result at step S3 represents that the reproduction output command key has been operated, data is read from the optical disc 10 (at step S4). Thereafter, it is determined whether or not the data that had been read from the optical disc 10 has been decrypted (at step S5). When the data has not been decrypted at step S5, the reproducing operation for the optical disc 10 is stopped (at step S6). Thereafter, the routine of the process is terminated.

When the determined result at step S5 represents that the data has been decrypted, it is determined whether or not electronic watermark information has been detected from the decrypted data (at step S11). When electronic watermark information has been detected at step S11, user reward information that contains charging discount rate and user reward data is extracted as decoded output data of the electronic watermark information decoding circuit 24 (at step S12). Data of the charging discount rate is obtained from the extracted user reward information (at step S13). Corresponding to the data of the obtained charging discount rate, the charging amount is calculated (at step S14). The charging amount of the calculated result at step S14 is displayed on the screen of the displaying portion 33. At that point, the charging discount rate is also displayed (at step S16).

On the other hand, when electronic watermark information has not been detected at step S11, the charging amount is calculated with no charging discount (at step S15). The charging amount of the calculated result at step S15 is displayed on the screen of the displaying portion 33 (at step S16). At that point, the charging discount rate displayed on the displaying portion 33 is 0%.

Thereafter, the system controller 100 determines whether or not a charging process can be performed (at step S17). In the charging process, the user is requested to insert a prepaid card 30 into the card reader 31. Thereafter, the value of the inserted prepaid card 30 is checked and it is determined whether or not the charging process can be performed corresponding to the value of the prepaid card 30.

When the determined result at step S17 represents that the inserted prepaid card 30 does not have a sufficient value, the reproducing operation of the optical disc 10 is stopped (at step S23). At that point, a message that represents that the value of the prepaid card 30 is sufficient is displayed on the displaying portion 33. Thereafter, the routine of the reproducing process is terminated.

When the determined result at step S17 represents that the value of the inserted prepaid card 30 is sufficient, the reproducing operation for content data is executed (at step S18). It is determined whether or not the reproducing operation for the content data has been completed (at step S19). When the reproducing operation has been completed, the charging process is executed so that that the charging amount is reduced from the value of the prepaid card 30 (at step S20). The charging process is executed by decrypting encrypted content data.

After user reward data has been obtained at step S12, it is determined whether or not a process for the obtained user reward data is required (at step S21). When the determined result at step S21 represents that a process for the obtained user record data is required, the user rewarding process for the user reward data is performed (at step S22). An example of the user rewarding process executed at step S22 will be described later.

When the determined result at step S21 represents that a process for the user reward data is not required or when the user rewarding process has been completed at step S22, the routine of the reproducing process is completed.

When the determined result at step S2 represents that the loaded optical disc 10 is a RAM disc, it is determined whether or not the reproduction output command key has been operated with the key operating portion 32 (at step S7). When the determined result at step S7 represents that the reproduction output command key has been operated, data is read from the optical disc 10 (at step S8). At that point, since the reproduced content data has not been encrypted, skipping the decrypting process, it is determined whether or not electronic watermark information has been detected (at step S9). When electronic watermark information has not been detected, the flow advances to step S15. At step S15, the charging amount is calculated with no charging discount. At step S16, the charging amount is displayed. Thereafter, the process after step S17 is performed.

When the determined result at step S9 represents that electronic watermark information has been detected, decoded data of SCMS information of copyright information contained in the electronic watermark information is checked. It is determined whether or not SCMS information is unconformable (at step S10).

In other words, data that had been read from another record medium has been recorded on a RAM disc. In this case, content data that had been copied one time has been recorded on a RAM disc. Thus, 2-bit SCMS information extracted from information read from the RAM disc must be "11" (copy prohibited) that has been rewritten by the recording apparatus. Consequently, when the SCMS information contained in the electronic watermark information detected at step S9 is "01" (that represents one generation copy permitted) rather than "11", it can be supposed that the content data of the RAM disc has been illegally copied. At step S10, it is checked whether or not the SCMS information is unconformable. When the SCMS information is unconformable, the flow advances to step S6. At step S6, the reproducing operation for the optical disc 10 is stopped. When the SCMS information is conformable at step S10, the flow advances to step S12. Thereafter, the reproducing process for the optical disc 10 is performed in the forgoing manner.

When the copyright owner records an original content to a CD-R disc, it is distinguished from a CD-RW disc corresponding to the difference of the reflectance. Only for a CD-RW disc, it may be determined whether or not the SCMS information is unconformable.

Next, an example of the user rewarding process at step S20 will be described. FIG. 8 is a flow chart showing an example of the user rewarding process. In this example, it is assumed that on the optical disc 10, information of a text of a song to be reproduced and a jacket photo of a performer and/or a singer has been recorded. As a reward to the user who has detected electronic watermark information, the song text and the jacket photo are provided.

As shown in FIG. 8, in the user rewarding process, a user reward obtained from user reward data is recognized (at step S31). For example, additional information shown in FIG. 4 is read. With the additional information that has been read, the user can know a reward he or she can obtain. Thereafter, it is determined whether or not the reward is service information such as a song text and a jacket photo recorded on the optical disc 10 (at step S32). When the determined result represents that the reward is service information, the service information such as a song text and a jacket photo is read from the optical disc 10 corresponding to record area information of service information contained in the user reward data (at step S33). The service information that has been read is displayed on the screen of the displaying portion 33 (at step S34).

When the determined result at step S32 represents that the reward is not service information recorded on the optical disc 10 or when the service information obtained at step S34 is displayed, the flow advances to step S35. At step S35, it is determined whether or not the reward contains a service coupon. When the determined result at step S35 represents that the reward contains a coupon, a connection request is issued to the address of the content provider through the network, the address having been registered in for example the ROM 103. As a result, a communication link is formed with the content provider through the network (at step S36).

Identification data, a password, and so forth are input by the user through the key operating portion 32 and transmitted to the content provider. The content provider authenticates the user (at step S37). When the content provider has successfully authenticated the user, the content provider issues a coupon to the user. When the user requests the content provider to issue a coupon, he or she can obtain it. When the content provider issues a coupon to the user, it is stored in a coupon storage box for the user (at step S38). The coupon storage box is provided for each user. Thereafter, another rewarding process (for example, service points are stored) is performed (at step S39). Thereafter, the routine of the user rewarding process is completed.

When the content provider has not successfully authenticated the user, the content provider informs the user of a corresponding message. The message is displayed on for example the displaying portion 33 (at step S40). Thereafter, another rewarding process (for example, service points are stored) is performed. Thereafter, the routine of the user rewarding process is completed.

According to the embodiment, compressed audio data is output through the IEEE 1394 interface 26. When the compressed audio data is output, corresponding to SCMS information contained in the electronic watermark information, the output of the IEEE 1394 interface 26 is controlled. Next, with reference to FIG. 9, the output control of the IEEE 1394 interface 26 will be described.

First of all, at step S41, a communication is made with an output destination through the IEEE 1394 bus. It is determined whether or not the output destination is an apparatus corresponding to the IEEE 1394 interface (hereinafter an apparatus corresponding to the IEEE 1394 interface is referred to as compliant apparatus). When the determined result at step S41 represents that a unit or an apparatus as the output destination is not a compliant apparatus, the flow advances to step S45. At step S45, compressed audio data is encrypted and output. However, an encryption key necessary for decrypting encrypted audio data is not transmitted to the unit or the apparatus as the output destination. Thus, a non-compliant apparatus cannot decrypt encrypted compressed audio data.

When the determined result at step S41 represents that the unit or the apparatus as the output destination is a compliant apparatus, the flow advances to step S42. At step S42, it is determined whether or not the compliant apparatus as the output destination is a recording apparatus. When the determined result at step S42 represents that the unit or the apparatus as the output destination is not a recording apparatus, the flow advances to step S44. At step S44, the compressed audio data is encrypted and output. In addition, an encryption key necessary for decrypting the encrypted audio data is transmitted to the compliant apparatus as the output destination.

When the determined result at step S42 represents that the output destination is a compliant recording apparatus, the flow advances to step S43. At step S43, the SCMS information is interpreted and then it is determined whether or not the SCMS information represents that "one generation copy permitted". When the determined result at step S43 represents that the recording operation is prohibited, the flow advances to step S45. At step S45, the compressed audio data is encrypted and output. However, an encryption key necessary for decrypting encrypted audio data is not transmitted to the compliant recording apparatus.

When the determined result at step S43 represents that the SCMS information represents that the recording operation is permitted, the flow advances to step S44. At step S44, the compressed audio data is encrypted and output. In addition, an encryption key necessary for decrypting encrypted audio data is transmitted to the compliant recording apparatus. In other words, compressed audio data is transferred to the compliant recording apparatus through the IEEE 1394 interface 26.

By the output control of the IEEE 1394 interface, only when the SCMS information represents that the copying operation is permitted, the data recording apparatus as the output destination can decrypt encrypted audio data using the transmitted encryption key and record the decrypted audio data. When the SCMS information represents that the recording operation is prohibited, since the encryption key is not transmitted to the compliant recording apparatus, it cannot decrypt compressed encrypted audio data. Thus, the compliant recording apparatus cannot correctly record audio data.

Thus, according to the first embodiment, when electronic watermark information is detected, user reward information is also obtained. Thus, in addition to a service corresponding to reward information, various types of services can be obtained. In contrast, when electronic watermark information is not detected, various types of services corresponding to user reward information cannot be obtained at all.

As a result, the user actively detects and uses electronic watermark information. Corresponding to SCMS information contained in electronic watermark information, the copy generation can be correctly restricted. As a result, the copyright can be properly protected.

According to the first embodiment, the charging process is performed using a prepaid card. Alternatively, the user may be pre-registered as a member to a content provider. The user may be authenticated and charged through the network. Of course, it is not necessary to use a prepaid card for the charging process.

[Data Reproducing Apparatus According to Second Embodiment]

FIG. 10 is a block diagram showing a data reproducing apparatus according to a second embodiment of the present invention. The second embodiment is also a data outputting apparatus. However, according to the second embodiment, content data is movie data (composed of video data and audio data). As an example of a record medium from which data is reproduced, an optical disc 40 is a DVD (Digital Video Disc or Digital Versatile Disc). Likewise, according to the second embodiment, a reproducing operation is charged corresponding to a prepaid system.

According to the second embodiment, advertisement information has been added to content data recorded on the optical disc 40. The advertisement information contains user reward information. When an advertisement is reproduced, the user reward information can be read. As a result, various types of user rewards can be obtained. The user reward information contained in the advertisement information has the same data structure shown in FIG. 4. However, it should be noted that according to the present invention, the data structure of the user reward information is not limited to that shown in FIG. 4.

As was described above, content data, advertisement information containing user reward information, and other information have been recorded on the optical disc 40. As shown in FIG. 10, the optical disc 40 is rotated and driven at for example constant linear velocity in such a manner that the rotating speed of a spindle motor 41 is controlled by a servo circuit 42. Data that is read from the optical disc 40 by an optical head 43 is supplied to a demodulating circuit 45 through an RF amplifier 44.

Data demodulated by the demodulating circuit 45 is supplied to an ECC decoder 46. The ECC decoder 46 performs an error correcting process for the demodulated data. The error-corrected data is supplied from the ECC decoder 46 to a demultiplexing circuit 47.

The demultiplexing circuit 47 separates the error-corrected data into video data, audio data, and advertisement data that have been compressed. The video data and the audio data are supplied to a decrypting circuit 48. The decrypting circuit 48 decrypts the video data and audio data that have been encrypted. When the video data and audio data have been decrypted, the corresponding information is supplied to a system controller 200. A charging process is performed when encrypted video data and audio data are decrypted.

The video data and audio data that have been decrypted by the decrypting circuit 48 are supplied to a decompressing circuit 49. The decompressing circuit 49 decompresses the video data and audio data. Decompressed video data V is converted into for example an NTSC video signal (not shown). The NTSC video signal is supplied to an NTSC monitor receiver (not shown). Decompressed audio data A is converted into an analog audio signal. The converted analog audio signal is supplied to a speaker (not shown) through a power amplifier (not shown).

The advertisement data is supplied from the demultiplexing circuit 47 to an advertisement data obtainment controlling circuit 51. The advertisement data obtainment controlling circuit 51 supplies advertisement data received from the demultiplexing circuit 47 to a decompressing circuit 52 and a reward information extracting circuit 53 only when the user issues an advertisement obtainment command through a key operating portion 62 (that will be described later).

The decompressing circuit 52 decompresses the advertisement data that has been compressed. In the same manner as the output video signal V, the decompressing circuit 52 supplies the decompressed advertisement data CM to the monitor receiver.

The reward information extracting circuit 53 extracts user reward information from the advertisement data, decodes the extracted user reward information, and supplies the decoded user reward information to the system controller 200. The system controller 200 performs a user rewarding process using the input user reward information as will be described later.

The system controller 200 is composed of a microcomputer. A CPU (Central Processing Unit) 201, a ROM 203, a RAM 204, I/O ports 211 to 215, a card reader interface 221, a communication interface 222, a key interface 223, an LCD (Liquid Crystal display) interface 224 are connected to a system bus 202.

A program for a reproducing process, a program for a charging process (that will be described later), and a program for a user rewarding process have been stored in the ROM 203. The RAM 204 is used as a work area.

A card reader 61 is connected to the card reader interface 221. The card reader 61 loads a prepaid card 60. According to the embodiment, as will be described later, a charging process is executed using the prepaid card 60. The communication interface 222 is connected to a content provider through a network. The key operating portion 62 is connected to the key interface 223. A displaying portion 63 composed of an LCD is connected to the LCD interface 224.

Figure 11B:
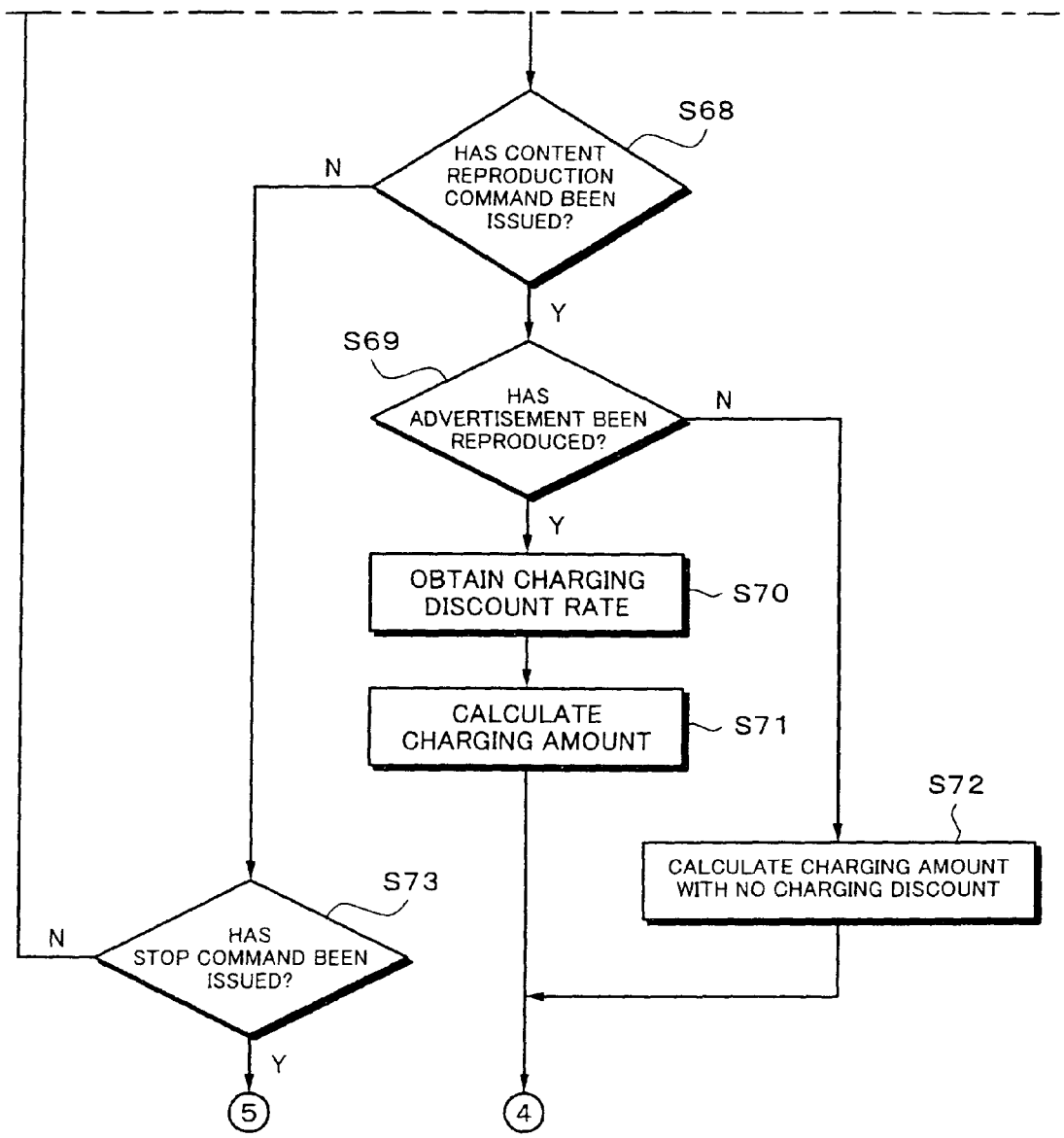
FIG. 11 is a part of a flow chart for explaining a reproducing operation according to the second embodiment shown in FIG. 10.
Figure 12:
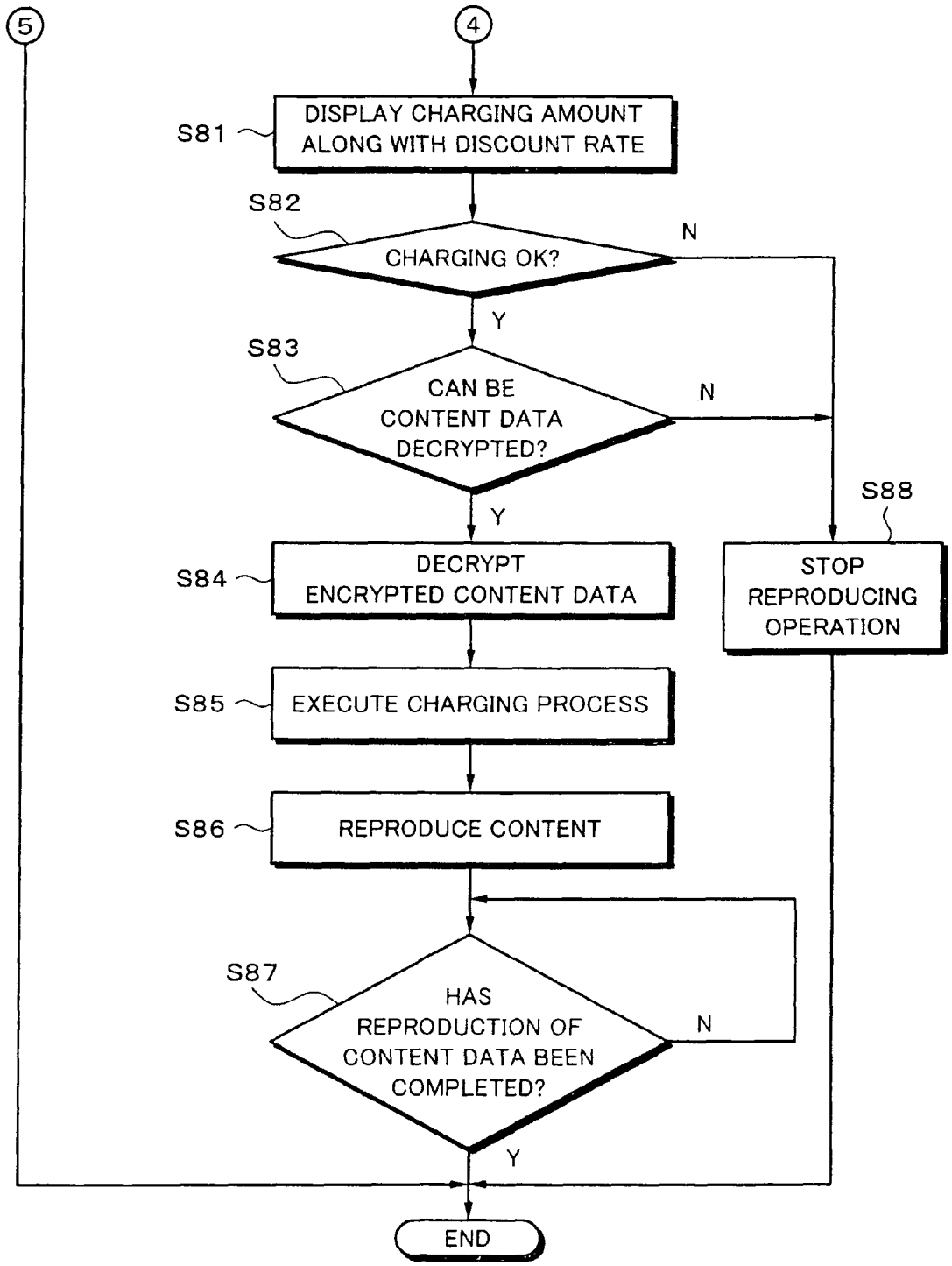
FIG. 12 is a part of the flow chart for explaining the reproducing operation according to the second embodiment shown in FIG. 10.

Next, with reference to flow charts shown in FIGS. 11 and 12, a data reproducing operation of the data reproducing apparatus according to the second embodiment shown in FIG. 10 will be described. The process shown in the flow charts is executed by a program stored in the ROM 203 of the system controller 200.

First of all, it is determined whether or not the optical disc 40 has been loaded to the data reproducing apparatus (at step S61). When the determined result at step 61 represents that the optical disc 40 has been loaded to the data reproducing apparatus, information about record data is read from the optical disc 40. Using the information that has been read from the optical disc 40, a content title screen with advertisement banners is displayed as shown in FIG. 13 (at step S62).

Figure 13:
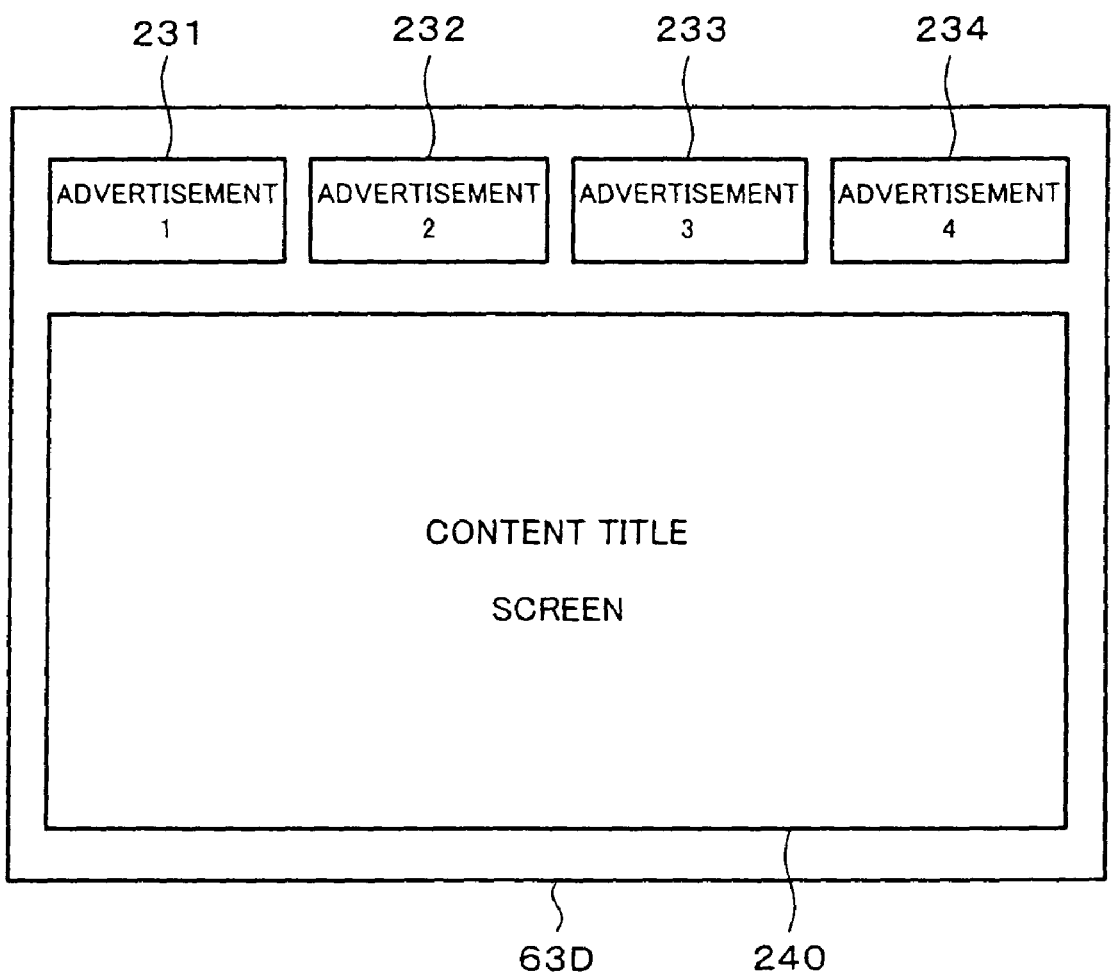
FIG. 13 is a schematic diagram for explaining the reproducing operation according to the second embodiment shown in FIG. 10.

FIG. 13 shows data displayed on a screen 63D of the displaying portion 63. The displayed data includes a content title screen 240 for a content title, main performer names, and so forth and four advertisement banners 231, 232, 233, and 234.

Each of the advertisement banners 231, 232, 233, and 234 is a small advertisement caption. When one of the advertisement banners 231, 232, 233, and 234 is selected and operated using the key operating portion 62, advertisement data of the selected advertisement banner is reproduced.

When the screen shown in FIG. 13 is displayed, it is determined whether one of the advertisement banners 231, 232, 233, and 234 has been selected and operated (at step S63). When the determined result at step S63 represents that one of the advertisement banners 231, 232, 233, and 234 has been selected and operated, using a control signal SC, advertisement data of the selected and operated advertisement banner is extracted from the advertisement data obtainment controlling circuit 51. The extracted advertisement data is decompressed by the decompressing circuit 52. The advertisement of the selected advertisement banner is displayed on the screen of the displaying portion 63 (at step S64).

At that point, the advertisement data is supplied to the reward information extracting circuit 53. The reward information extracting circuit 53 extracts user reward information from the advertisement data, decodes the extracted user reward information, and supplies the decoded data to the system controller 200. The user reward information is temporarily stored in the RAM 204 (at step S65).

After the advertisement has been reproduced (at step S66), a user rewarding process is performed using the user reward information stored in the RAM 204 (at step S67). The user rewarding process performed at step S67 is the same as the user rewarding process described with reference to FIG. 8.

After the user rewarding process has been performed, the flow returns to step S62. At step S62, the content title screen with advertisement banners is displayed. When the determined result at step S63 represents that another advertisement banner has been selected and operated, the cycle from steps S64 to S67 is repeated. As a result, a user reward corresponding to the corresponding advertisement is executed.

In contrast, when the determined result at step S63 represents that no advertisement banner has been selected and operated, it is determined whether or not a reproduction start command has been issued through the key operating portion 62 (at step S68). When the determined result at step S68 represents that the reproduction start command has been issued, before the reproduction start command is executed, it is determined whether or not the advertisement has been reproduced (at step S69).

When the determined result at step S69 represents that the advertisement has been reproduced, information about a charging discount rate contained in the reward information stored in the RAM 204 is obtained (at step S70). Thereafter, the charging amount is calculated (at step S71). The charging amount of the calculated result is displayed on the displaying portion 63. At that point, the charging discount rate is also displayed on the displaying portion 63 (at step S81 shown in FIG. 12).

When the determined result at step S69 represents that the advertisement has not been reproduced, the charging amount is calculated with no charging discount (at step S72). The charging amount of the calculated result is displayed on the screen of the displaying portion 63 (at step S81). At that point, the charging discount rate becomes 0%.

Thereafter, the system controller 200 determines whether or not the charging process can be performed (at step S82). In the process, the user is requested to insert the prepaid card 60 into the card reader 61. The value of the card reader 61 is checked. It is determined whether or not the charging process can be executed.

When the determined result at step S82 represents that the value of the prepaid card is insufficient, the reproducing operation is stopped (at step S88). Thereafter, the routine of the reproducing process is terminated.

In contrast, when the determined result at step S82 represents that the value of the prepaid card is sufficient, it is determined whether or not the content data can be decrypted (at step S83). When the determined result at step S83 represents that the content data can be decrypted, the flow advances to step S88. At step S88, the reproducing operation is stopped. Thereafter, the routine of the reproducing process for the optical disc 40 is terminated.

When the determined result at step S83 represents that the copyright data can be decrypted, the decrypting process is continued (at step S84). Thereafter, the charging process is executed (at step S85). As was described above, when the user has reproduced the advertisement, since a charging discount is obtained, the charging amount becomes inexpensive. Thereafter, the content data is reproduced (at step S86). After the content data has been reproduced or when the user issues a reproduction stop command (at step S87), the reproducing operation is stopped. Thereafter, the routine of the reproducing process is completed.

In contrast, when the determined result at step S83 represents that the content data cannot be decrypted, the flow advances to step S88. At step S88, the reproducing operation for the optical disc 40 is stopped.

When the determined result at step S68 represents that the content reproduction command has not been issued, it is determined whether or not the content reproduction stop command has been issued (at step S73). When the determined result at step S73 represents that the stop command has been issued, the routine of the reproducing process is completed. When the determined result at step S73 represents that the stop command has not been issued, the flow returns to step S62. At step S62, the process after step S62 is repeated.

As was described above, according to the second embodiment of the present invention, when advertisement information has been reproduced before content data is reproduced, user reward information is also obtained. As a result, a charging discount is obtained. In addition, various types of services can be obtained. In contrast, when content data is reproduced without an advertisement, a charging discount cannot be obtained at all. In addition, various types of services corresponding to the user reward information cannot be obtained at all.

Thus, it can be expected that the user can actively reproduce an advertisement. Thus, there is an advantage of which an advertisement can be effectively performed.

According to the second embodiment, the charging process is performed using a prepaid card. Alternatively, the user may be pre-registered as a member to the content provider. When the user reproduces content data, he or she may be authenticated and charged through the network. Of course, the charging process is not limited to the prepaid system.

As with the first embodiment, according to the second embodiment, electronic watermark information may be added to content information. A user reward corresponding to the electronic watermark information may be also used.

[Data Recording Apparatus According to Embodiment]

Figure 14:
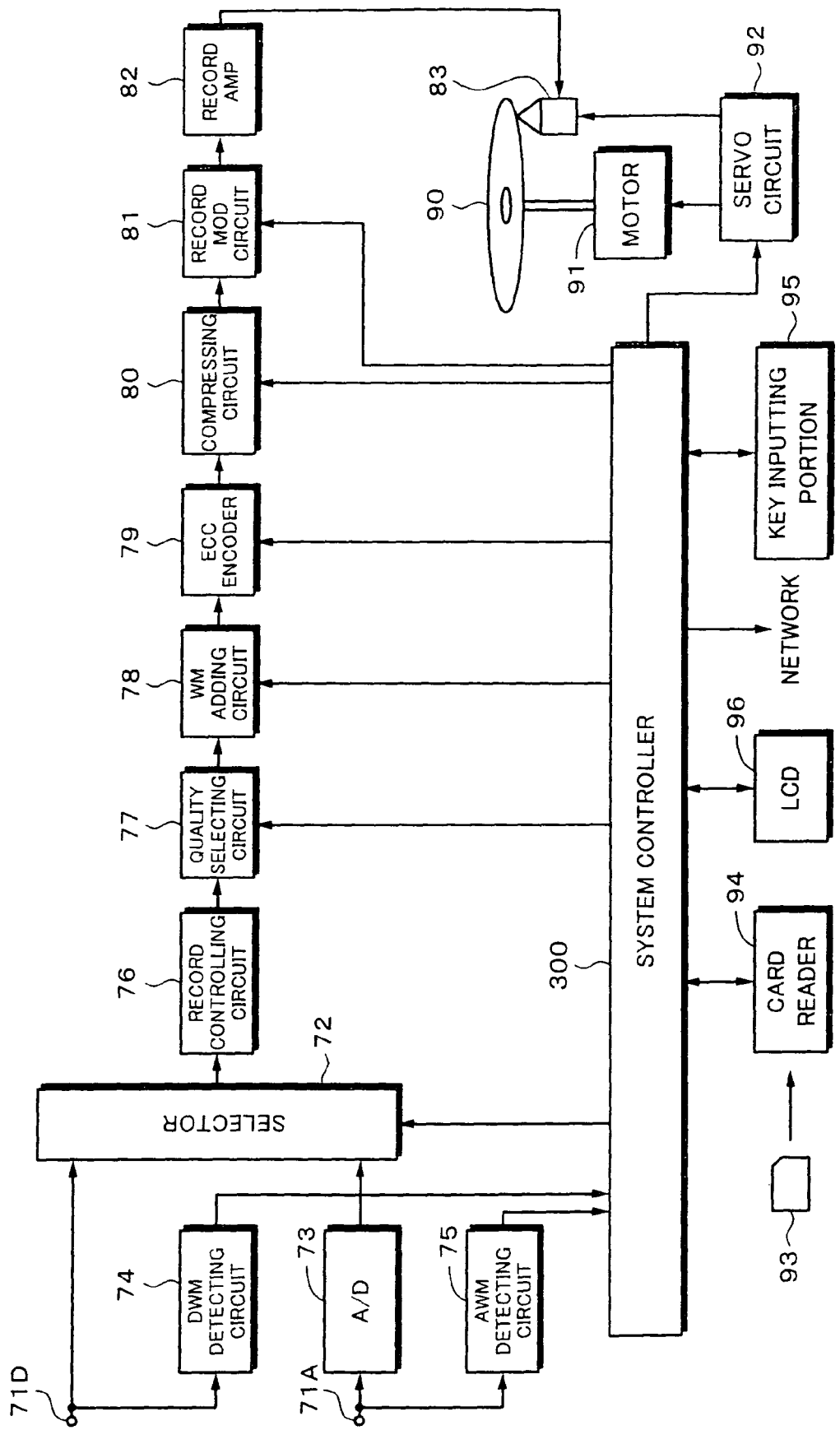
FIG. 14 is a block diagram showing a data recording apparatus according to an embodiment of the present invention.

FIG. 14 is a block diagram showing a data reproducing apparatus according to an embodiment of the present invention. According to the embodiment, content data is music data. According to the embodiment, a record medium is an optical disc 90. According to the embodiment, a charging process is performed corresponding to a prepaid system when content that is recorded.

According to the embodiment, copyright information for controlling a copy recording operation (in this example, additional data that contains SCMS information) is added as electronic watermark information to content data. As with the first embodiment, additional data as an electronic watermark contains user reward information. The data structure of the user reward information according to the embodiment shown in FIG. 14 is almost the same as the data structure shown in FIG. 4.

In addition, according to the embodiment shown in FIG. 14, when electronic watermark information is detected from content data to be recorded, the content data can be recorded with a higher quality as a reward than the case that electronic watermark information is not used.

According to the embodiment shown in FIG. 14, it is considered that there are two types of digital data and analog data as content data that is input to the data recording apparatus. In addition, digital electronic watermark information and analog electronic watermark information are added to digital content data and analog content data, respectively.

For example, as digital electronic watermark information, four low order bits (starting from the LSB) of 16-bit audio PCM data are used as embedded digital electronic watermark information. As analog electronic watermark information, embedded electronic watermark information shown in FIG. 3 is used.

In FIG. 14, digital audio PCM data that is input through a digital input terminal 71D is supplied to a selector 72. In addition, the digital audio PCM data is supplied to a digital electronic watermark information detecting circuit (hereinafter, referred to as DWM detecting circuit as shown in FIG. 14) 74.

An analog audio signal that is input through an analog input terminal 71A is converted into a digital signal by an A/D converter 73. Thereafter, the digital signal is supplied to a selector 72. In addition, the digital signal is supplied to an analog electronic watermark information detecting circuit (hereinafter referred to as AWM detecting circuit as shown in FIG. 14) 75. An output of electronic watermark information detected by the DWM detecting circuit 74 and an output of electronic watermark information detected by the AWM detecting circuit 75 are supplied to a system controller 300.

The system controller 300 supplies an input select signal to a selector 72. The input select signal causes the selector 72 to select the analog audio signal or the digital audio signal. The system controller 300 generates an input select signal corresponding to an input operation of the user through a key inputting portion 95.

Data obtained from the selector 72 is supplied to a record controlling circuit 76. The system controller 300 supplies a control signal corresponding to SCMS information of an output detected by the DWM detecting circuit 74 or the AWM detecting circuit 75 to the record controlling circuit 76 and performs a record control that executes a recording operation or prohibits it.

When the record controlling circuit 76 executes the recording operation, the audio PCM data is supplied to a quality selecting circuit 77. When the system controller 300 receives an output of electronic watermark information detected by the DWM detecting circuit 74 or the AWM detecting circuit 75, the system controller 300 causes the quality selecting circuit 77 to select a high quality output. Otherwise, the system controller 300 causes the quality selecting circuit 77 to select a low quality output.

Figure 15:
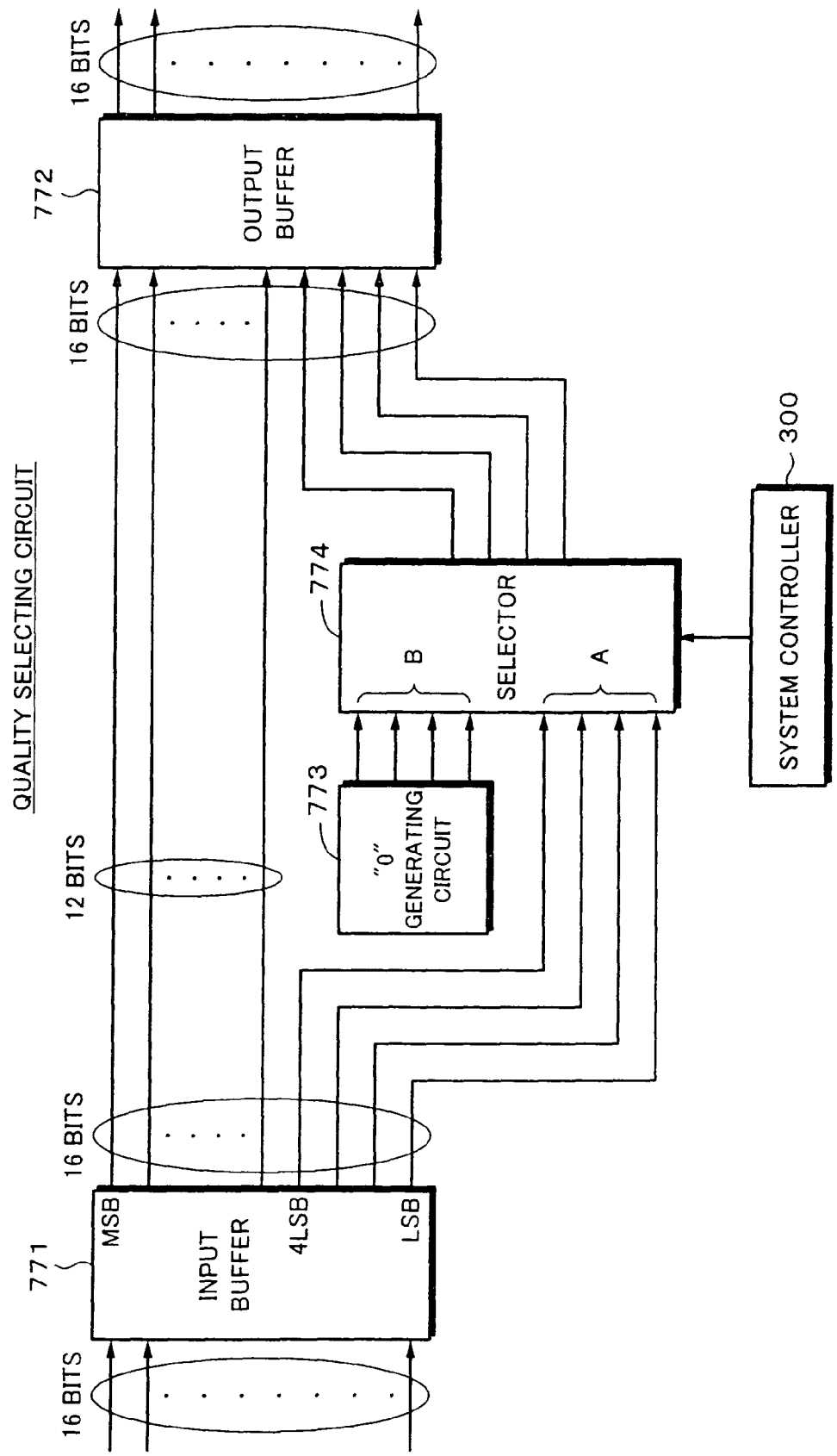
FIG. 15 is a block diagram showing a part of a circuit according to the embodiment shown in FIG. 14.

FIG. 15 is a block diagram showing an example of the quality selecting circuit 77. In the quality selecting circuit 77, 16-bit input audio data is supplied to an input buffer 771.

High order 12 bits of the 16-bit audio data of the input buffer 771 are supplied as high order 12 bits of an output buffer 772. Low order four bits of the 16-bit audio data of the input buffer 771 are supplied to one input terminal A having four bits of a selector 774. Four bits of "0" data are supplied from a "0" data generating circuit 773 to the other input terminal B having four bits of the selector 774.

When the system controller 300 has received an output of electronic watermark information detected by the DWM detecting circuit 74 or the AWM detecting circuit 75, the system controller 300 causes the selector 774 to select input data of the input terminal A and output the input data. When the system controller 300 has not received an output of electronic watermark information detected by the DWM detecting circuit 74 or the AWM detecting circuit 75, the system controller 300 causes the selector 774 to select input data of the input terminal B and output the input data.

Thus, in the data recording apparatus, when electronic watermark information is detected by the DWM detecting circuit 74 or the AWM detecting circuit 75 and the detected electronic watermark information is used, the selector 774 outputs low order four bits of the original audio PCM data received from the input buffer 771 through the input terminal A to the output buffer 772 as its low order four bits. When the electronic watermark information is not used, the selector 774 outputs four bits of "0" data received from the "0" data generating circuit 773 through the input terminal B to the output buffer 772 as its low order four bits.

Thus, when electronic watermark information is not used, the low order four bits of the 16-bit audio PCM data are converted into all "0" data and output from the quality selecting circuit 77. Thus, the quality of the PCM audio data is deteriorated in comparison with the quality of the original audio PCM data. On the other hand, when the electronic watermark information is used, the original 16-bit audio PCM data is directly output from the quality selecting circuit 77 without a deterioration. Thus, when electronic watermark information is used, higher quality data is output than the case that the electronic watermark information is not used.

Audio data that is output from the quality selecting circuit 77 is supplied to an electronic watermark information adding circuit 78. The electronic watermark information adding circuit 78 rewrites SCMS information of the electronic watermark information shown in FIG. 4. In other words, when the SCMS information contained in the electronic watermark information detected by the DWM detecting circuit 74 or the AWM detecting circuit 75 represents "one generation copy permitted", the electronic watermark information adding circuit 78 rewrites the SCMS information so that it represents "copy prohibited".

Audio data that is output from the electronic watermark information adding circuit 78 is supplied to an ECC encoder 79. The ECC encoder 79 performs an error correction encoding process for the input data using for example CIRC (Cross Interleave Reed-Solomon code).

The ECC encoder 79 supplies the error-corrected encoded data to a compressing circuit 80. The compressing circuit 80 compresses the audio data and supplies the compressed audio data to a record modulating circuit 81. The record modulating circuit 81 performs a modulating process suitable for recording the compressed audio data, for example, a record modulating process corresponding to EFM (Eight-to-Fourteen Modulation) system.

The record modulating circuit 81 supplies the modulated data to a recording head 83 through a recording amplifier 82. The recording head 83 writes data to a RAM type optical disc 90. The optical disc 90 is rotated and driven by a spindle motor 91. A servo circuit 92 performs a servo control at constant linear velocity so that the optical disc 90 is rotated as a predetermined rotating speed. The servo circuit 92 generates a velocity servo signal corresponding to for example an audio PCM signal to be recorded and supplies the generated velocity servo signal to the spindle motor 91.

When the optical disc 90 is a CD-R disc, the recording head 83 heats an organic dye material that composes a recording layer of the optical disc 90 and deforms a part of the substrate of the optical disc 90 so as to record data. When the optical disc 90 is a CD-RW disc, the recording head 83 varies the state of the recording layer between crystal and amorphous so as to record data.

As with the forgoing embodiments, the system controller 300 (not shown in FIG. 14) is composed of a microcomputer. A ROM connected to the CPU of the system controller 300 through the system bus stores a program for a recording process, a program for a charging process, and a program for a user rewarding process.

According to the embodiment shown in FIG. 14, to perform a charging process, a card reader 94 that loads a prepaid card 93 is connected to the system controller 300. The system controller 300 is connected to a content provider through a network. In addition, a key operating portion 95 and a displaying portion 96 composed of an LCD are connected to the system controller 300.

Next, with reference to a flow chart shown in FIG. 16, a data recording operation of the data recording apparatus shown in FIG. 14 according to the embodiment of the present invention will be described.

First of all, it is determined whether or not a record key of the key operating portion 95 has been operated and a record command has been issued (at step S91). When the determined result at step S91 represents that the record key has not been operated, a process corresponding to the operated key is performed (at step S92).

When the determined result at step S91 represents that the record key has been operated, it is determined that a record command has been issued. Thereafter, it is determined whether or not the input data is an analog input (at step S93). The determination at step S93 is performed depending on whether the input selected with the key operating portion 95 is an analog input or a digital input. When the determined result at step S93 represents that the input data is an analog input, analog electronic watermark information is detected. Thereafter, it is determined whether or not the analog electronic watermark information has been detected (at step S94).

When the determined result at step S94 represents that analog electronic watermark information has not been detected, the system controller 300 causes the quality selecting circuit 77 to convert low order four bits to all "0" and output audio data with a lower quality than the input data. Thus, audio data with a low quality is recorded to the optical disc 90 (at step S98).

When analog electronic watermark information has been detected at step S94, the analog electronic watermark information is interpreted (at step S95). As a result, it is determined whether or not the analog electronic watermark information represents "one generation copy permitted" (at step S96). When the determined result at step S96 represents that the analog electronic watermark information represents "one generation copy permitted", the system controller 300 causes the record controlling circuit 76 to execute the recording operation for the data. In addition, the system controller 300 causes the quality selecting circuit 77 to output the original 16-bit audio data with a high quality. Thus, audio data with an original quality is recorded to the optical disc 90 (at step S97). At that point, the electronic watermark information adding circuit 78 adds electronic watermark information to audio data. However, the SCMS information that represents "one generation copy permitted" is rewritten so that it represents "copy prohibited". In the example, detected electronic watermark information other than the SCMS information is used as it is and recorded.

When the determined result at step S96 represents that the analog electronic watermark information represents "copy prohibited", the flow advances to step S104. At step S104, the record controlling circuit 76 is controlled so as to prohibit the recording operation. In reality, the record data supplied to the quality selecting circuit 77 is stopped. As a result, the recording operation for the optical disc 90 is stopped.

When the determined result at step S93 represents that input data is a digital input rather than an analog input, digital electronic watermark information is detected. Thereafter, it is determined whether or not the digital electronic watermark information has been detected (at step S99). When the digital electronic watermark information has not been detected at step S99, the system controller 300 causes the quality selecting circuit 77 to convert low order four bits to all "0" and output audio data with a lower quality than the input data. Thus, audio data with a lower quality than the input data is recorded to the optical disc 90 (at step S103).

When digital electronic watermark information has been detected at step S99, the digital electronic watermark information is interpreted (at step S100). Thereafter, it is determined whether or not the digital electronic watermark information represents "one generation copy permitted" (at step S101). When the digital electronic watermark information represents "one generation copy permitted", the system controller 300 causes the record controlling circuit 76 to record data to the optical disc 90 and the quality selecting circuit 77 to output high quality data of the original 16-bit audio data. Thus, audio data with the original quality is recorded to the optical disc 90 (at step S102).

When the determined result at step S101 represents that the digital electronic watermark information represents "record prohibited", the flow advances to step S104. At step S104, the recording operation for the optical disc 90 is stopped. Thereafter, the recording process is terminated.

Figure 16:
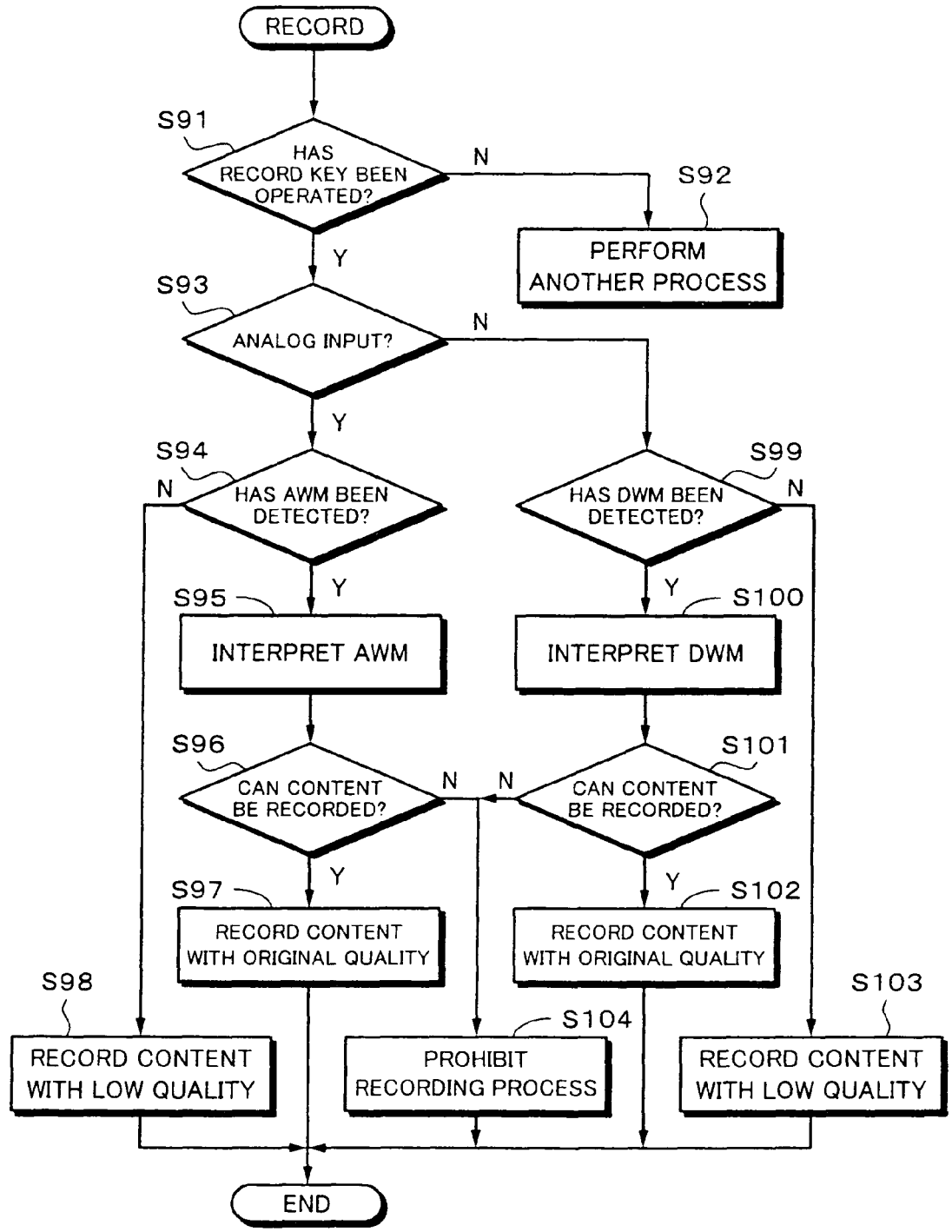
FIG. 16 is a flow chart for explaining a recording operation according to the embodiment shown in FIG. 14.

In the flow chart shown in FIG. 16, as a user reward, record quality is mainly assured. Thus, a charging process and other user rewarding processes were omitted. However, as with the data reproducing apparatuses according to the foregoing embodiments, in the data recording apparatus shown in FIG. 14, when electronic watermark information is used, a charging process using data of a charging discount rate contained in user reward information is performed. When electronic watermark information is not used, a charging process is performed with no discount.

When electronic watermark information is used, the user can obtain service data contained in user reward information and various types of coupons.

In the case that advertisement information has been added to content data to be recorded, before the content data is recorded, when the advertisement is reproduced, an advantage of which the content data can be recorded with a charging discount can be obtained. In addition, other user rewards can be obtained.

Thus, in the data recording apparatus according to the forgoing embodiment, when electronic watermark information is used, content data with a higher quality can be copied than the case that the electronic watermark information is not used. In addition, user reward information is obtained. As a result, a charging discount can be obtained. Moreover, various types of services can be obtained.

Consequently, it can be expected that the user can actively use electronic watermark information. Thus, copyright protection can be properly performed.

In the forgoing embodiment, the charging process is performed corresponding to a prepaid system using a prepaid card. Alternatively, the user may be registered as a member to the content provider. In this case, the user may authenticated and charged through the network. Of course, the charging process may be performed by other than the prepaid system.

Other Embodiments

In the data reproducing apparatus according to the forgoing embodiments, the quality selecting circuit 77 of the data recording apparatus according to the embodiment shown in FIG. 14 may be disposed. As a user reward for which the user uses electronic watermark information or reproduces an advertisement, the quality of the reproduced output can be improved in comparison with the case that the user neither uses the electronic watermark information nor reproduces the advertisement.

In the data recording apparatus according to the embodiment, when electronic watermark information is not used, content data is copied at a normal recording speed prescribed in the standard. In contrast, when electronic watermark information is used, content data may be copied at a higher recording speed than prescribed in the standard as a user reward.

When electronic watermark information is used or an advertisement is reproduced, a user reward menu may be displayed on the LCD screen so that the user can select his or her desired reward. In this case, when a message that represents that when the user uses electronic watermark information or reproduces an advertisement, he or she can obtain a reward is displayed, it can be expected that the use of the electronic watermark information and the reproduction of the advertisement are promoted.

In the case that copyright information has been added to content data in an additional format rather than electronic watermark information, the present invention can be applied as with the foregoing embodiments.

In addition, the data outputting apparatuses according to the embodiments of the present invention are not limited to data outputting apparatuses. In other words, for example, the data outputting apparatuses according to the embodiments of the present invention can be applied to a so-called set top box and a broadcast receiving apparatus.

As was described above, according to the present invention, when electronic watermark information is used or an advertisement is reproduced, the user can obtain a reward. Thus, the use of electronic watermark information and the reproduction of advertisements are promoted. Consequently, the copyright management can be effectively performed. In addition, since the hit rates of advertisements are improved, advertisements can be effectively made.

The invention claimed is:

1. A recording method, comprising the steps of:
   when content data to which additional data has been added is recorded, detecting whether or not the additional data has been detected from the content data to be recorded;
   when the additional data has been detected, recording the content data with the original quality; and
   when the additional data has not been detected, recording the content data with a lower quality than the original quality to the record medium,
   wherein the additional data contains copyright data for controlling recording operation,
   wherein the recording step of lower quality is performed by converting low order bits of the data to all zeros and recording the resultant data to the record medium.

2. The recording method as set forth in claim 1, further comprising the steps of:
   interpreting the detected additional data; and
   when the interpreted additional data represents that a recording operation is permitted, recording the data to the record medium.

3. The recording method as set forth in claim 2, further comprising the steps of:
   interpreting the detected additional data; and
   when the interpreted additional data represents that a recording operation is prohibited, terminating the recording operation for the data to the record medium.

4. The recording method as set forth in claim 2, wherein the additional data contains copyright data.

5. The recording method as set forth in claim 4, wherein the additional data has been embedded as electronic watermark information to the data.

6. The recording method as set forth in claim 1, further comprising the steps of:
   determining the type of the data; and
   when the determined result represents that the data is analog data, determining whether or not the additional data added to the analog data has been detected.

7. The recording method as set forth in claim 1, further comprising the steps of:
   determining the type of the data; and
   when the determined result represents that the data is digital data, determining whether or not the additional data added to the digital data has been detected.

8. A recording apparatus for a record medium, comprising:
   additional data detecting portion for detecting additional data added to input content data;
   a selecting circuit portion for selecting the quality of the input content data;
   an encoder for performing an encoding process for causing output content data of the selecting circuit to be recorded;
   a head portion to which output data of the encoder is supplied; and
   a controlling portion to which a detected output of the additional data detecting portion is supplied, when the additional data has been detected by the additional data detecting portion, the controlling portion causing the selecting circuit portion to output content data with the same quality as the input data, and
   wherein when the additional data detecting portion has not detected the additional data, the controlling portion causes the selecting circuit portion to output content data with a lower quality than the input data,
   wherein the selecting circuit portion has:
   a buffer memory for buffering the input data;
   a selector for selecting low order bit data of the output data of the buffer memory or zero data corresponding to a control signal that is output from the controlling portion and outputting the selected data; and
   a combining portion for combining high order bit data of the output data of the buffer memory and the output data of the selector.

9. The recording apparatus for the record medium as set forth in claim 8,
   wherein the selecting circuit portion has a data generating portion for generating the zero data.

10. The recording apparatus for the record medium as set forth in claim 8,
    wherein the additional data has been embedded as electronic watermark information to the input data, and
    wherein the additional data detecting portion detects the electronic watermark information from the input data.

11. The recording apparatus for the record medium as set forth in claim 8,
    wherein the additional data contains copyright data, and
    wherein the encoder has an additional circuit portion for rewriting the copyright data of the output data of the selecting circuit portion.

12. The recording apparatus for the record medium as set forth in claim 11,
    when the copyright data is data that represents a recordable state, the additional circuit portion rewrites the copyright data to a state that represents that a recording operation is prohibited.

* * * * *